United States Patent
Narayanaswamy

(10) Patent No.: US 11,907,366 B2
(45) Date of Patent: Feb. 20, 2024

(54) INTROSPECTION DRIVEN BY INCIDENTS FOR CONTROLLING INFILTRATION

(71) Applicant: Netskope, Inc., Santa Clara, CA (US)

(72) Inventor: Krishna Narayanaswamy, Saratoga, CA (US)

(73) Assignee: Netskope, Inc., Santa Clara, CA (US)

(\*) Notice: Subject to any disclaimer, the term of this patent is extended or adjusted under 35 U.S.C. 154(b) by 0 days.

(21) Appl. No.: 17/871,852

(22) Filed: Jul. 22, 2022

(65) Prior Publication Data

US 2022/0358254 A1 Nov. 10, 2022

Related U.S. Application Data

(62) Division of application No. 16/257,027, filed on Jan. 24, 2019, now Pat. No. 11,416,641.

(51) Int. Cl.
*G06F 21/55* (2013.01)
*G06F 21/62* (2013.01)
(Continued)

(52) U.S. Cl.
CPC ............ *G06F 21/55* (2013.01); *G06F 21/41* (2013.01); *G06F 21/552* (2013.01);
(Continued)

(58) Field of Classification Search
CPC ........ G06F 21/55; G06F 21/41; G06F 21/552; G06F 21/554; G06F 21/56; G06F 21/602;
(Continued)

(56) References Cited

U.S. PATENT DOCUMENTS

| 5,452,460 A | 9/1995 | Distelberg et al. |
| 6,574,655 B1 | 6/2003 | Libert et al. |

(Continued)

FOREIGN PATENT DOCUMENTS

| EP | 2378455 A2 | 10/2011 |
| EP | 2544117 A1 | 1/2013 |

(Continued)

OTHER PUBLICATIONS

Liu, Simon; Kuhn, Rick; "Data Loss Prevention", IT Professional, vol. 12, Issue 2, IEEE, Mar. 29, 2010, pp. 10-13.*

(Continued)

*Primary Examiner* — Victor Lesniewski
(74) *Attorney, Agent, or Firm* — Haynes Beffel & Wolfelf LLP; Ernest J. Beffel, Jr.

(57) ABSTRACT

The technology disclosed teaches incident-driven and user-targeted data loss prevention that includes a CASB controlling infiltration via cloud-based services storing documents in use by organization users, by monitoring manipulation of the documents. The CASB identifies the cloud-based services that the particular user has access to and at least one document location on the cloud-based services to inspect for sensitive documents, in response to receiving an indication that user credentials have been compromised. The CASB performs deep inspection of documents identified as stored at the location and detects at least some sensitive documents. Based on the detected sensitive documents, the CASB determines an exposure for the organization due to the particular user.

15 Claims, 16 Drawing Sheets

(51) Int. Cl.
  *G06Q 30/018* (2023.01)
  *G06F 21/60* (2013.01)
  *G06F 21/41* (2013.01)
  *G06F 21/88* (2013.01)
  *H04L 67/51* (2022.01)
  *G06F 21/56* (2013.01)

(52) U.S. Cl.
  CPC ............ *G06F 21/554* (2013.01); *G06F 21/56* (2013.01); *G06F 21/602* (2013.01); *G06F 21/604* (2013.01); *G06F 21/6245* (2013.01); *G06F 21/88* (2013.01); *G06Q 30/018* (2013.01); *H04L 67/51* (2022.05)

(58) Field of Classification Search
  CPC .... G06F 21/604; G06F 21/6245; G06F 21/88; G06Q 30/018; H04L 67/51; H04L 63/0815; H04L 63/0428; H04L 67/1097
  See application file for complete search history.

(56) References Cited

U.S. PATENT DOCUMENTS

| | | |
|---|---|---|
| 6,829,654 B1 | 12/2004 | Jungck |
| 6,898,636 B1 | 5/2005 | Adams et al. |
| 6,981,155 B1 | 12/2005 | Lyle et al. |
| 7,231,426 B1 | 6/2007 | Hall et al. |
| 7,272,646 B2 | 9/2007 | Cooper et al. |
| 7,296,058 B2 | 11/2007 | Throop |
| 7,475,146 B2 | 1/2009 | Bazot et al. |
| 7,478,434 B1 | 1/2009 | Hinton et al. |
| 7,536,439 B1 | 5/2009 | Jaladanki et al. |
| 7,587,499 B1 | 9/2009 | Haghpassand |
| 7,996,373 B1 | 8/2011 | Zoppas et al. |
| 8,127,365 B1 | 2/2012 | Liu et al. |
| 8,130,747 B2 | 3/2012 | Li et al. |
| 8,280,986 B2 | 10/2012 | Deprun |
| 8,281,372 B1 | 10/2012 | Vidal |
| 8,346,580 B2 | 1/2013 | Nakfoor |
| 8,438,630 B1 | 5/2013 | Clifford |
| 8,549,300 B1 | 10/2013 | Kumar et al. |
| 8,572,757 B1 | 10/2013 | Stamos et al. |
| 8,613,070 B1 | 12/2013 | Borzycki et al. |
| 8,677,448 B1* | 3/2014 | Kauffman ............ G06F 21/6245 726/1 |
| 8,776,249 B1 | 7/2014 | Margolin |
| 8,819,772 B2 | 8/2014 | Bettini et al. |
| 8,856,869 B1 | 10/2014 | Brinskelle |
| 8,914,461 B2 | 12/2014 | Murai |
| 9,069,436 B1 | 6/2015 | Fieweger et al. |
| 9,069,955 B2* | 6/2015 | Dolph ..................... H04L 63/14 |
| 9,069,992 B1 | 6/2015 | Vaikar et al. |
| 9,137,131 B1 | 9/2015 | Sarukkai et al. |
| 9,171,008 B2 | 10/2015 | Prahlad et al. |
| 9,197,628 B1 | 11/2015 | Hastings |
| 9,246,944 B1* | 1/2016 | Chen ..................... G06F 21/604 |
| 9,270,765 B2 | 2/2016 | Narayanaswamy et al. |
| 9,398,102 B2 | 7/2016 | Narayanaswamy et al. |
| 9,553,860 B2 | 1/2017 | Meyer |
| 9,565,202 B1 | 2/2017 | Kindlund et al. |
| 9,613,190 B2 | 4/2017 | Ford et al. |
| 9,697,349 B2 | 7/2017 | Li et al. |
| 9,716,724 B1 | 7/2017 | Chennuru et al. |
| 9,917,817 B1 | 3/2018 | Lad et al. |
| 9,928,377 B2 | 3/2018 | Narayanaswamy et al. |
| 9,998,496 B2 | 6/2018 | Narayanaswamy et al. |
| 10,102,570 B1* | 10/2018 | Kapczynski ............ G06Q 40/02 |
| 10,114,966 B2 | 10/2018 | Narayanaswamy et al. |
| 10,162,767 B2 | 12/2018 | Spurlock et al. |
| 10,235,520 B2 | 3/2019 | Bae |
| 10,291,657 B2 | 5/2019 | Narayanaswamy et al. |
| 10,349,304 B2 | 7/2019 | Kim et al. |
| 10,404,755 B2 | 9/2019 | Narayanaswamy et al. |
| 10,404,756 B2 | 9/2019 | Narayanaswamy et al. |
| 10,462,165 B1 | 10/2019 | Salour |
| 10,594,730 B1 | 3/2020 | Summers et al. |
| 10,728,262 B1* | 7/2020 | Vaswani ................. G06F 21/62 |
| 10,826,940 B2 | 11/2020 | Narayanaswamy et al. |
| 10,855,671 B2 | 12/2020 | Kahol et al. |
| 10,860,730 B1* | 12/2020 | Weaver ............... H04L 67/1097 |
| 11,019,101 B2 | 5/2021 | Narayanaswamy et al. |
| 2001/0011238 A1 | 8/2001 | Eberhard et al. |
| 2001/0054157 A1 | 12/2001 | Fukumoto |
| 2002/0016773 A1 | 2/2002 | Ohkuma et al. |
| 2002/0138593 A1 | 9/2002 | Novak et al. |
| 2003/0135465 A1 | 7/2003 | Lee et al. |
| 2004/0122977 A1 | 6/2004 | Moran et al. |
| 2004/0205360 A1 | 10/2004 | Norton et al. |
| 2004/0268451 A1 | 12/2004 | Robbin et al. |
| 2005/0086197 A1 | 4/2005 | Boubez et al. |
| 2005/0251856 A1 | 11/2005 | Araujo et al. |
| 2005/0289354 A1 | 12/2005 | Borthakur et al. |
| 2006/0075481 A1 | 4/2006 | Ross et al. |
| 2007/0006293 A1 | 1/2007 | Balakrishnan et al. |
| 2007/0220251 A1 | 9/2007 | Rosenberg et al. |
| 2007/0289006 A1 | 12/2007 | Ramachandran et al. |
| 2008/0034418 A1 | 2/2008 | Venkatraman et al. |
| 2008/0127303 A1 | 5/2008 | Wrighton et al. |
| 2008/0216174 A1 | 9/2008 | Vogel et al. |
| 2008/0229428 A1 | 9/2008 | Camiel |
| 2008/0301231 A1 | 12/2008 | Mehta et al. |
| 2009/0022319 A1 | 1/2009 | Shahaf et al. |
| 2009/0044260 A1 | 2/2009 | Niglio et al. |
| 2009/0225762 A1 | 9/2009 | Davidson et al. |
| 2009/0232300 A1 | 9/2009 | Zucker et al. |
| 2009/0296926 A1 | 12/2009 | Perlman |
| 2010/0024008 A1 | 1/2010 | Hopen et al. |
| 2010/0146269 A1 | 6/2010 | Baskaran |
| 2010/0188975 A1 | 7/2010 | Raleigh |
| 2010/0251369 A1 | 9/2010 | Grant |
| 2011/0016197 A1 | 1/2011 | Shiimori et al. |
| 2011/0047590 A1 | 2/2011 | Carr et al. |
| 2011/0131408 A1 | 6/2011 | Cook et al. |
| 2011/0154506 A1 | 6/2011 | O'Sullivan et al. |
| 2011/0196914 A1 | 8/2011 | Tribbett |
| 2011/0247045 A1 | 10/2011 | Rajagopal et al. |
| 2011/0264906 A1 | 10/2011 | Pourzandi et al. |
| 2011/0277027 A1 | 11/2011 | Hayton et al. |
| 2011/0321170 A1 | 12/2011 | Onodera et al. |
| 2012/0020307 A1 | 1/2012 | Henderson et al. |
| 2012/0023323 A1 | 1/2012 | Kent, Jr. et al. |
| 2012/0106366 A1 | 5/2012 | Gauvin |
| 2012/0144189 A1 | 6/2012 | Zhong |
| 2012/0151551 A1 | 6/2012 | Readshaw et al. |
| 2012/0204260 A1 | 8/2012 | Cecil et al. |
| 2012/0237908 A1 | 9/2012 | Fitzgerald et al. |
| 2012/0278872 A1 | 11/2012 | Woelfel et al. |
| 2013/0006865 A1 | 1/2013 | Spates |
| 2013/0024942 A1 | 1/2013 | Wiegenstein et al. |
| 2013/0055342 A1 | 2/2013 | Choi et al. |
| 2013/0145483 A1 | 6/2013 | DiMuro et al. |
| 2013/0268677 A1 | 10/2013 | Marshall et al. |
| 2013/0340076 A1* | 12/2013 | Cecchetti ............... G06F 21/563 717/123 |
| 2014/0007182 A1 | 1/2014 | Qureshi et al. |
| 2014/0007222 A1 | 1/2014 | Qureshi et al. |
| 2014/0026181 A1 | 1/2014 | Kiang et al. |
| 2014/0026182 A1 | 1/2014 | Pearl et al. |
| 2014/0032691 A1 | 1/2014 | Barton et al. |
| 2014/0115329 A1* | 4/2014 | Sturonas ................. H04L 9/0822 713/165 |
| 2014/0165148 A1 | 6/2014 | Dabbiere et al. |
| 2014/0165213 A1 | 6/2014 | Stuntebeck |
| 2014/0245381 A1 | 8/2014 | Stuntebeck et al. |
| 2014/0259190 A1 | 9/2014 | Kiang et al. |
| 2014/0298469 A1* | 10/2014 | Marion ............... H04L 63/1416 726/23 |
| 2014/0317681 A1 | 10/2014 | Shende |
| 2014/0337862 A1 | 11/2014 | Valencia et al. |
| 2014/0344573 A1 | 11/2014 | Tsai et al. |
| 2014/0380491 A1 | 12/2014 | Abuelsaad et al. |
| 2015/0019870 A1 | 1/2015 | Patnala et al. |

(56) References Cited

U.S. PATENT DOCUMENTS

| | | | |
|---|---|---|---|
| 2015/0020207 A1* | 1/2015 | Kasiviswanathan | ......................... G06F 21/554 726/26 |
| 2015/0100357 A1 | 4/2015 | Seese et al. | |
| 2015/0135300 A1* | 5/2015 | Ford | ...................... G06Q 50/18 726/11 |
| 2015/0135302 A1 | 5/2015 | Cohen et al. | |
| 2015/0142986 A1 | 5/2015 | Reznik et al. | |
| 2015/0172120 A1 | 6/2015 | Dwarampudi et al. | |
| 2015/0172311 A1* | 6/2015 | Freedman | ............... H04L 63/20 726/1 |
| 2015/0271207 A1 | 9/2015 | Jaiswal et al. | |
| 2015/0312227 A1 | 10/2015 | Follis et al. | |
| 2016/0044035 A1 | 2/2016 | Huang | |
| 2016/0087970 A1 | 3/2016 | Kahol et al. | |
| 2016/0094483 A1 | 3/2016 | Johnston et al. | |
| 2016/0269467 A1 | 9/2016 | Lee et al. | |
| 2016/0275577 A1 | 9/2016 | Kolluri Venkata Sesha et al. | |
| 2016/0277374 A1 | 9/2016 | Reid et al. | |
| 2016/0285918 A1 | 9/2016 | Peretz et al. | |
| 2016/0292445 A1 | 10/2016 | Lindemann | |
| 2017/0063720 A1 | 3/2017 | Foskett et al. | |
| 2017/0091453 A1 | 3/2017 | Cochin | |
| 2017/0091482 A1 | 3/2017 | Sarin et al. | |
| 2017/0093867 A1 | 3/2017 | Burns et al. | |
| 2017/0206353 A1 | 7/2017 | Jai et al. | |
| 2017/0251013 A1* | 8/2017 | Kirti | ....................... H04L 63/20 |
| 2017/0264640 A1 | 9/2017 | Narayanaswamy et al. | |
| 2017/0329972 A1* | 11/2017 | Brisebois | ............... G06F 21/577 |
| 2017/0331777 A1* | 11/2017 | Brisebois | ............... H04L 51/212 |
| 2018/0027006 A1* | 1/2018 | Zimmermann | ...... G06F 21/6218 726/11 |
| 2018/0063182 A1 | 3/2018 | Jones et al. | |
| 2018/0173891 A1* | 6/2018 | Wang | .................. G06F 21/6245 |
| 2018/0232526 A1* | 8/2018 | Reid | ...................... H04L 9/3213 |
| 2018/0302430 A1* | 10/2018 | Israel | ...................... G06Q 50/01 |
| 2018/0324204 A1 | 11/2018 | McClory et al. | |
| 2018/0375886 A1* | 12/2018 | Kirti | ................... H04L 63/1425 |
| 2019/0034295 A1 | 1/2019 | Bourgeois et al. | |
| 2019/0158513 A1* | 5/2019 | Shtar | ..................... G06F 21/552 |
| 2019/0222597 A1* | 7/2019 | Crabtree | ............... H04L 43/045 |
| 2019/0230111 A1* | 7/2019 | Backer | .................. H04L 63/108 |
| 2019/0260794 A1* | 8/2019 | Woodford | .............. G06N 20/00 |
| 2019/0266347 A1* | 8/2019 | Indukuri | ............... H04W 12/30 |
| 2020/0372040 A1 | 11/2020 | Boehmann et al. | |

FOREIGN PATENT DOCUMENTS

| | | |
|---|---|---|
| JP | 2011234178 A | 11/2011 |
| JP | 2012084141 A | 4/2012 |
| JP | 2015130112 A | 7/2015 |
| WO | 2006109187 A2 | 10/2006 |
| WO | 2006137057 A2 | 12/2006 |
| WO | 2007009255 A1 | 1/2007 |
| WO | 2008017008 A2 | 2/2008 |
| WO | 2009094654 A1 | 7/2009 |
| WO | 2012058487 A2 | 5/2012 |
| WO | 2014141045 A1 | 9/2014 |
| WO | 2015002875 A1 | 1/2015 |
| WO | 2019226363 A1 | 11/2019 |

OTHER PUBLICATIONS

Pandire, Poonam A.; Gaikwad, Vishwajit B.; "Attack Detection in Cloud Virtual Environment and Prevention using Honeypot", International Conference on Inventive Research in Computing Applications (ICIRCA), IEEE, Jul. 11-12, 2018, pp. 515-520.*
The 15 Critical CASB Use Cases, Netskope, Inc., Oct. 2016, 19 pages.
PCT/US2014/21174—International Search Report and Written Opinion, dated Aug. 29, 2014, 13 pages.
EP 14761047.1—Extended Search Report dated Aug. 4, 2016, 7 pages.
PCT/US2014/21174—International Preliminary Report on Patentability, dated Sep. 8, 2015, 10 pages.
EP 14761047.1—Response to Extended Search Report dated Aug. 4, 2016 filed Feb. 28, 2017, 10 pages.
EP 14761047.1—Notice of Allowance dated Jun. 1, 2018, 45 pages.
EP 18199916.0—Extended European Search Report dated Feb. 14, 2019, 8 pages.
Akana, "API Gateway: Key Security Features", Mar. 10, 2015, 2 pages, XP055312562, Retrieved from the Internet: http://resource.akana.com/datasheets/api-gateway-security-features.
Berg et al, "Issue September/October API Governance and Management by Longji Tang, Mark Little LXXXVI Security and Identity Management Applied to SOA-Part II A Look at Service-Driven Industry Models Contents", Service Technology Magazine, Sep. 1, 2014, pp. 1-45, XP055243185, Retrieved from the Internet: URL:http://servicetechmag.com/system/application/views/I86/ServiceTechMag.com_Issue86_online.pdf.
PCT/US2016/014197—International Search Report and Written Opinion dated Mar. 24, 2017, 22 pages.
Netskope, "The 5 Steps to Cloud Confidence", Version 1, Oct. 3, 2013, 8 pages.
Netskope, "The 5 Steps to Cloud Confidence", Version 3, Jun. 17, 2014, 10 pages.
Netskope, "The 5 Steps to Cloud Confidence" comparison between Sep. 11, 2014 version 4 and Jan. 29, 2014 version 2, Aug. 15, 2017, 12 pages.
PCT/US2016/014197—International Preliminary Report on Patentability dated Sep. 28, 2017, 15 pages.
JP 2018-500266—Request for Examination and PCT-PPH Request, along with amendments filed on Jan. 25, 2018, 22 pages.
JP 2018-500266—First Office Action dated Mar. 20, 2018, 8 pages.
EP 16763347.8—Rule 71(3) EPC Communication (Notice of Allowance) dated Jun. 1, 2018, 89 pages.
JP 2018-500266—Response to First Office Action dated Mar. 20, 2018 filed Jul. 20, 2018 , 6 pages.
JP 2018-500266—Notice of Allowance dated Jul. 31, 2018, 9 pages.
JP 2018-160069—Voluntary Amendments filed Oct. 3, 2018, 82 pages.
EP 16763347.8—Response to Rule 71(3) EPC Communication (Notice of Allowance) dated Jun. 1, 2018, as filed Oct. 11, 2018, 20 pages.
JP 2018-160069—Notice of Allowance dated Jan. 8, 2019, 8 pages.
EP 18201903.4—Extended European Search Report dated Jan. 31, 2019, 13 pages.
Cheng et al., "Cloud Security For Dummies, Netskope Special Edition," John Wiley & Sons, Inc., dated 2015, 53 pages.
"Netskope Introspection," netSkope, Inc., 2015, 3 pgs.
Netskope, "Data Loss Prevention and Monitoring in the Cloud", Nov. 2014, 18 pages.
Netskope, "The 5 Steps to Cloud Confidence," netSkope Inc., 2014, 11 pgs.
"Repave the Cloud-Data Breach Collision Course," netSkope, Inc., 2014, 6 pgs.
PCT/US2017/021969—International Search Report and Written Opinion dated Jun. 22, 2017, 11 pages.
Laminin Solutions: "Metadata Permissions Protects Confidential Information", Feb. 19, 2013, pp. 1-2 XP002770913.
Yague et al., "A Metadata-based access control model for web services", Computer Science Department, Internet Research, vol. 15, No. 1, University of Malaga, Malaga, Spain, Dec. 31, 2005, pp. 99-116, XP002770914.
Gowadia etal., "RDF Metadata for XML Access Control", Proceedings of the ACM Workshop on XML Security 2003. Fairfax, VA, Oct. 31, 2003, pp. 39-48, XP001198168.
Kuwabara et al., "Use of Metadata for Access Control and Version Management in RDF Database", Sep. 12, 2011, Knowledge-Based and Intelligent Information and Engineering Systems, Springer Berling Heidelberg, pp. 326-336, XP019164752.
PCT/US2017/021969—International Preliminary Report on Patentability dated Mar. 5, 2018, 13 pages.
JP 2018-547387—Notice of Allowance dated Mar. 25, 2019, 7 pages.

(56) References Cited

OTHER PUBLICATIONS

EP-17713822.9, Rule 71(3) Allowance Communication dated Mar. 8, 2019, 147 pages.

"Cloud Data Loss Prevention Reference Architecture", Netskope, Sep. 2015, WP-88-1, 2 pages.

"The Netskope Active Platform Enabling Safe Migration to the Cloud", Apr. 2015, DS-1-8, Netskope, Inc., 6 pages.

"The Netskope Advantage: Three "Must-Have" Requirements for Cloud Access Security Brokers", Jul. 2015, WP-12-2, 4 pages.

"Netskope Cloud Confidence Index," netSkope, Inc., 2015, 4 pgs.

"Data Breach: The Cloud Multiplier Effect", Ponemon Institute, Jun. 4, 2014, 27 pages.

Chang et al, "Bigtable: A Distributed Storage System for Structured Data", Operating Systems Design and Implementation, OSDI, 2006, 14 pages.

DeCandia et al, "Dynamo: Amazon's Highly Available Key-value Store", SOSP '07, Oct. 14-17, 2007, 16 pages.

EP 19189235.5 Rule 71(3)—Intent to Grant, dated Dec. 17, 2020, 7 pages.

EP 19189235.5 Extended European Search Report dated Nov. 27, 2019, 5 pages.

JP 2019-081108 First Office Action, dated May 18, 2021, 7 pages.

JP 2018-5473875—Notice of Allowance with Allowed Claims dated Mar. 25, 2019, 7 pages.

Kark et al, "Trends: Calculating the Cost of a Security Breach", Forrester Research, Inc. Apr. 10, 2007, 7 pgs.

Lakshman et al, "Cassandra—A Decentralized Structured Storage System", 2009, 6 pages.

Riley et al, "Magic Quadrant for Cloud Access Security Brokers", Nov. 30, 2017, 28 pages, downloaded from—https://go.netskope.com/typ-gartner-mq-for-casb.html .

Sumit Khurana, et. al., "Performance evaluation of Virtual Machine (VM) scheduling policies in Cloud computing (spaceshared & timeshared)"; 2013 Fourth International Conference on Computing, Communications and Networking Technologies (ICCCNT); Year: Jul. 2013; pp. 1-5.

Office 365 Team, "Office 365—Our Latest Innovations in Security and Compliance," Microsoft Inc., Oct. 28, 2014, 6 pages, Retrieved from the Internet: <http://blogs.office.com/2014/10/28/office-365-latest-innovations-security-compliance/> [Apr. 10, 2015].

Axway, Comprehensive API and SOA 1-25 Security, Mar. 18, 2015, XP055310645, 3 Pages, Retrieved from the Internet: http://www.axway.com/sites/default/files/brief_files/axway_solutionbrief_api_soa security_en.pdf>.

Akana, "API Security: A Guide To Securing Your Digital Channels", Mar. 15, 2015, XP055312513, Sections 2 and 3, Retrieved from the Internet: <http://resource.akana.com/white-papers/api-security-a-guide-to-securing-your-digital-channels.

Netskope, "The 5 Steps to Cloud Confindence", Jan. 1, 2014, XP055312652, 12 pages, Retrieved from the Internet: <URL:http://www.dgcompany.nl/downloads/The> 5 Steps to Cloud Confidence.pdf.

Netskope, "Netskope Active Cloud DLP", 2015, 4 pages.

Netskope, "Netskope Cloud Confidence Index™", netSkope, Inc., 2015, 4 pages, downloaded from http://go.netskope.com/rs/netskope/images/NS-Cloud-Confidence-Index-DS-00.pdf.

Oasis, Key Management Interoperability Protocols Use Cases Version 1.2, dated Mar. 18, 2013, 132 pages.

U.S. Appl. No. 14/198,499, filed Mar. 5, 2014, U.S. Pat. No. 9,398,102, Jul. 19, 2016, Issued.

U.S. Appl. No. 14/198,508, filed Mar. 5, 2014, U.S. Pat. No. 9,270,765, Feb. 23, 2016, Issued.

U.S. Appl. No. 14/835,640, filed Aug. 25, 2015, U.S. Pat. No. 9,928,377, Mar. 27, 2018, Issued U.S. Appl. No. 14/835,632, filed Aug. 25, 2015, U.S. Pat. No. 10,114,966, Oct. 30, 2018, Issued.

U.S. Appl. No. 15/368,240, filed Dec. 2, 2016, U.S. Pat. No. 10,826,940, Nov. 3, 2020, Issued.

* cited by examiner

Event log entry 205

```
{
  "id" : "7f47d93960fa18234d9bd324",
  "ap" : "Dropbox",
  "User Id" : "dbmid:AAC3pJdyx792vptgc3fOCs_RPiqgjattv9k",
  "acm" : "API Connector",
  "tid" : "1001",
  "apc" : "Cloud Storage",
  "alr" : "no",
  "_cts" : ISODate("2017-02-16T09:34:32.609Z"),
  "inid" : "Sumoskope",
  "sip" : "182.73.130.70",
  "ty" : "nspolicy",
  "ts" : 1487238383,
  "User Name" : "Rama Rao",
  "tid" : 70006,
  "urip" : "182.73.130.70",
  "oid" : "/0000000000000/10MB-Self-Text.txt",
  "act" : "Share",
  "cnid" : NumberLong("2440431367181"),
  "br" : "unknown",
  "dv" : "unknown",
  "fur" : "ramarao@netskope.com",
  "_its" : 1487238872,
  "obt" : "File",
  "sz" : "",
  "obj" : "/0000000000000/10MB-Self-Text.txt",
  "sr" : "19",
  "session_id" : NumberLong("1422938010094273"),
  "ur" : "ramarao@netskope.com",
  "ccl" : "high",
  "uk" : "ramarao@netskope.com",
  "sl" : "Bangalore",
  "sc" : "India",
  "_ssbg" : 1,
  "ou" : "",
  "os" : "iOS",
  "slc" : [
       77.3833,
       12.9833
  ]
}
```

302 { "_id" : "fb3c0d72b9ee2d50d05f6a321368a8869cb14d7a", "usage" : 0, "lut" : 1490125228, "name" : "ghostking", "appname" : "box", "updt" : 1490125222, "instance" : "nammazone", "isAdmin" : "False", "user" : "sateesh+box@netskope.com", "lastLoginTime" : null, "uid" : "262054341" }

312 { "_id" : "1bf1baedaf31ee167671 5b000a32899ba2618293", "usage" : 0, "lut" : 1490125229, "name" : "Shreekumar B", "appname" : "box", "updt" : 1490125222, "instance" : "nammazone", "isAdmin" : "False", "user" : "shreekumar_b@outlook.com", "lastLoginTime" : null, "uid" : "1264837589" }

322 { "_id" : "74114882302", "mimeType" : "application/vnd.openxmlformats-officedocument.wordprocessingml.document", "uid" : "257490553", "links" : 0, "filePath" : [ "/All Files/AA_July13_Expire/ByKelly.docx" ], "app" : "Box", "sharedType" : "private", "tenantid" : "1001", "modifiedDate" : 1468407264, "createdDate" : 1468407264, "user" : "gbansal@netskope.com", "domain_shared_with" : ["acme.com"], "lut" : 1489556095, "title" : "ByKelly.docx", "fileType" : "Documents", "appname" : "box", "method" : "hoard", " " : "ownership" : "isInternallyOwned", "collaborated" : "notCollaborated", "instance" : "nammazone", "parentId" : "8829464034", "pathId" : "74114882302", "shared" : [], "public" : [], "fileSize" : 15178, "access_method" : [ "API Connector" ] }

352 { "_id" : "11661721358", "mimeType" : "resource/folder", "uid" : "213716996", "links" : 0, "filePath" : [ "/All Files/dev/DLP-PCI" ], "app" : "Box", "sharedType" : "private", "tenantid" : "1001", "modifiedDate" : 1478069485, "createdDate" : 1476270395, "user" : "admin@nammazone.com", "domain_shared_with" : [], "lut" : 1478603664, "title" : "DLP-PCI", "fileType" : "Folder", "appname" : "box", "method" : "hoard", "collaborated" : "isInternallyOwned", "instance" : "nammazone", "parentId" : "8339082893", "pathId" : "11661721358", "shared" : [], "public" : [], "fileSize" : 91828, "access_method" : [ "API Connector" ] }

362 { "_id" : "11137246890", "mimeType" : "resource/folder", "uid" : "213716996", "links" : 0, "filePath" : [ "/All Files/dev/DLP-SourceCode" ], "app" : "Box", "sharedType" : "external", "tenantid" : "1001", "modifiedDate" : 1472643018, "createdDate" : 1472642989, "user" : "admin@nammazone.com", "domain_shared_with" : [ "gmail.com" ], "lut" : 1478757311, "title" : "DLP-SourceCode", "fileType" : "Folder", "appname" : "box", "method" : "hoard", "ownership" : "isInternallyOwned", "collaborated" : "collaborated", "instance" : "nammazone", "parentId" : "8339082893", "pathId" : "11137246890", "shared" : [], "public" : [ "bala@gmail.com" ], "fileSize" : 106061, "access_method" : [ "API Connector" ] }

372 { "_id" : "11137086924", "mimeType" : "resource/folder", "uid" : "213716996", "links" : 1, "filePath" : [ "/All Files/dev/DLP-PHI" ], "app" : "Box", "sharedType" : "internal", "tenantid" : "1001", "modifiedDate" : 1476875787, "createdDate" : 1472643019, "user" : "admin@nammazone.com", "domain_shared_with" : [], "lut" : 1478603660, "title" : "DLP-PHI", "fileType" : "Folder", "appname" : "box", "method" : "hoard", "collaborated" : "notCollaborated", "instance" : "nammazone", "parentId" : "8339082893", "pathId" : "11137086924", "shared" : [], "public" : [ "Everyone in Organization" ], "fileSize" : 880558, "access_method" : [ "API Connector" ] }

FIG. 3

INTROSPECTION DRIVEN BY INCIDENTS FOR CONTROLLING INFILTRATION

PRIORITY APPLICATION

This application is a divisional of U.S. Non Provisional application Ser. No. 16/257,027, entitled "Incident-Driven Introspection for Data Loss Prevention," filed 24 Jan. 2019, now U.S. Pat. No. 11,416,641, issued 16 Aug. 2022.

INCORPORATIONS

The following materials are incorporated by reference in this filing:

U.S. Non Provisional application Ser. No. 14/198,508, entitled "SECURITY FOR NETWORK DELIVERED SERVICES", filed on Mar. 5, 2014 (now U.S. Pat. No. 9,270,765, issued Feb. 23, 2016), U.S. Non Provisional application Ser. No. 14/198,499, entitled "SECURITY FOR NETWORK DELIVERED SERVICES", filed Mar. 5, 2014 (now U.S. Pat. No. 9,398,102, issued on Jul. 19, 2016), U.S. Non Provisional application Ser. No. 14/835,640, entitled "SYSTEMS AND METHODS OF MONITORING AND CONTROLLING ENTERPRISE INFORMATION STORED ON A CLOUD COMPUTING SERVICE (CCS)", filed on Aug. 25, 2015 (now U.S. Pat. No. 9,928,377, issued on Mar. 27, 2018), U.S. Non Provisional application Ser. No. 15/368,240, entitled "SYSTEMS AND METHODS OF ENFORCING MULTI-PART POLICIES ON DATA-DEFICIENT TRANSACTIONS OF CLOUD COMPUTING SERVICES", filed on Dec. 2, 2016, which claims the benefit of U.S. Provisional Application No. 62/307,305, entitled "SYSTEMS AND METHODS OF ENFORCING MULTI-PART POLICIES ON DATA-DEFICIENT TRANSACTIONS OF CLOUD COMPUTING SERVICES", filed on Mar. 11, 2016, U.S. Non Provisional application Ser. No. 14/835,632, entitled "SYSTEMS AND METHODS OF PER-DOCUMENT ENCRYPTION OF ENTERPRISE INFORMATION STORED ON A CLOUD COMPUTING SERVICE (CCS)", filed on Aug. 25, 2015 (now U.S. Pat. No. 10,114,966, issued on Oct. 30, 2018), which claims the benefit of U.S. Provisional Application No. 62/135,656, entitled "SYSTEMS AND METHODS OF MONITORING AND CONTROLLING ENTERPRISE INFORMATION STORED ON A CLOUD COMPUTING SERVICE (CCS), filed on Mar. 19, 2015, U.S. Non Provisional application Ser. No. 15/368,246, entitled "MIDDLE WARE SECURITY LAYER FOR CLOUD COMPUTING SERVICES", filed on Dec. 2, 2016, which claims the benefit of U.S. Provisional Application No. 62/307,305, entitled "SYSTEMS AND METHODS OF ENFORCING MULTI-PART POLICIES ON DATA-DEFICIENT TRANSACTIONS OF CLOUD COMPUTING SERVICES", filed on Mar. 11, 2016, "Cloud Security for Dummies, Netskope Special Edition" by Cheng, Ithal, Narayanaswamy, and Malmskog, John Wiley & Sons, Inc. 2015, "Netskope Introspection" by Netskope, Inc., "Data Loss Prevention and Monitoring in the Cloud" by Netskope, Inc., "Cloud Data Loss Prevention Reference Architecture" by Netskope, Inc., "The 5 Steps to Cloud Confidence" by Netskope, Inc., "The Netskope Active Platform" by Netskope, Inc.

"The Netskope Advantage: Three "Must-Have" Requirements for Cloud Access Security Brokers" by Netskope, Inc., "The 15 Critical CASB Use Cases" by Netskope, Inc.

"Netskope Active Cloud DLP" by Netskope, Inc.,

"Repave the Cloud-Data Breach Collision Course" by Netskope, Inc.; and

"Netskope Cloud Confidence Index™" by Netskope, Inc.

which are incorporated by reference for all purposes as if fully set forth herein.

FIELD OF THE TECHNOLOGY DISCLOSED

The technology disclosed relates generally to security for network delivered services, and in particular relates to incident-driven and user-targeted data loss prevention by a cloud access security broker (CASB) controlling exfiltration of sensitive content in documents stored on cloud-based services in use by users of an organization, by monitoring manipulation of the documents. The disclosed technology additionally relates to data loss prevention by a CASB controlling infiltration of contaminating content on cloud-based services in use by an organization.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The use of cloud services for corporate functionality is common. According to International Data Corporation, almost half of all information technology (IT) spending will be cloud-based in 2018, "reaching 60% of all IT infrastructure and 60-70% of all software, services and technology spending by 2020." For example, enterprise companies often utilize software as a service (SaaS) solutions instead of installing servers within the corporate network to deliver services.

Network architecture approaches that log and protect access on a corporate network offer limited control. VPN solutions are often used to control access to the protected corporate network. Proxies, both transparent and explicit, are often used to filter or limit access to undesirable web sites, when the client is accessing the web sites from within the corporate network. Filtering software can also be installed on client computers, e.g. safe browsing software, to enforce limits on access. Additionally, the sprawl of "bring your own devices" (BYODs) motivate the need for additional network-based security protections. A viable security solution provides centrally administered control, enforcing the same protection policy across multiple devices, network services, and networks—including corporate networks.

Data is the lifeblood of many businesses and must be effectively managed and protected to meet compliance requirements. Protecting data in the past was focused primarily for on premise scenarios, but with the increased adoption of cloud services, companies of all sizes are relying on the cloud to create, edit and store data. This presents new challenges as users access cloud services from multiple devices and share data, including with people outside of an organization. It is easy for data to get out of an organization's control.

As the number of cloud services increases exponentially, there are hundreds of ways data can leak. Employees might attach a wrong file while sending e-mails, hit the send button too early, not be careful when rushing to a deadline, or share data and collaborate with people outside of their organization. Native cloud storage sync clients also pose a significant risk to organizations, as a continuous sync takes place between the end point and the cloud service without employees realizing they may be leaking confidential company information. Additionally, cloud services are making it possible for disgruntled workers to steal intellectual property. Also, sharing content from the cloud has never been easier. The challenge is the risk that sensitive data could get into the wrong hands. For example, when logs that contain sensitive data such as customers' personally identifiable information (PII), non-public financials, strategic plans and customer lists are stored in the cloud, the data needs to be protected.

An opportunity arises to determine data exposure for an organization due to compromised credentials of a particular user or set of users. Additionally litigation exposure for an organization due to the access of a new user to infiltrated contaminating content post-joining can be determined.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 2 is an exemplary event log entry in a JSON-style representation.

FIG. 3 shows a log that contains user-by-user data and file-by-file data that identify user file sharing behavior.

FIG. 4 shows folders for an Outlook online application, for drafts, sent items, deleted items, junk email, outbox, RSS subscriptions and search folders. FIG. 5 shows a set of shared folders in cloud-based app Box.

FIG. 7A shows a display of the compromised credentials for incidents for 15 users.

FIG. 7B shows violations and file exposure for a single user.

FIG. 7C shows folders for a user with compromised credentials.

FIG. 7D shows graphs of file exposure, violations by file type including container files, documents, images and folders.

FIG. 7E shows an example set of data reported by Netskope cloud access security broker for a Cisco Spark web interface for a single user.

DETAILED DESCRIPTION

Figure 1A:
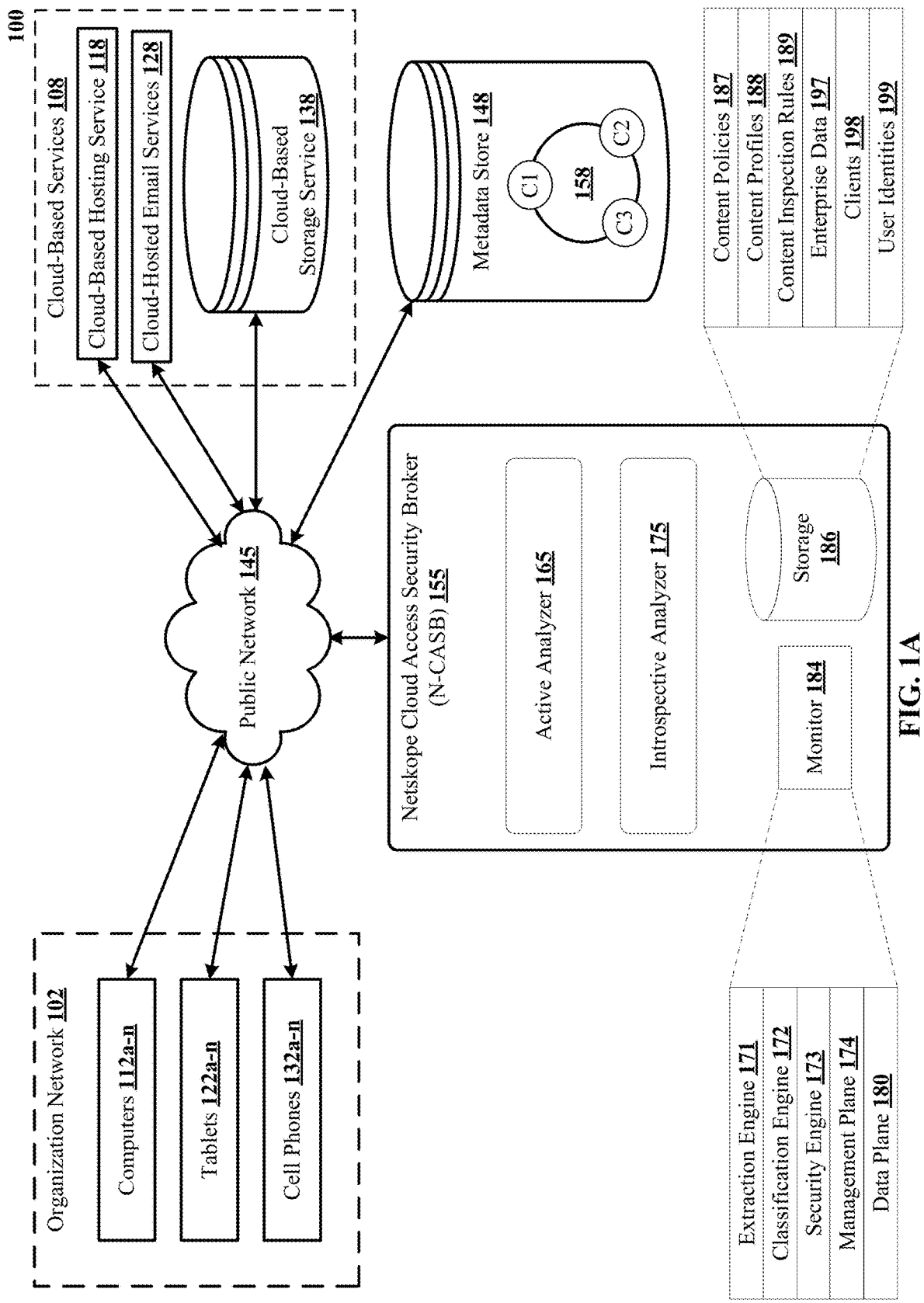
FIG. 1A illustrates an architectural level schematic of a system for incident-driven and user-targeted data loss prevention.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Cloud computing ranks as the top risk concern for executives in risk, audit, finance and compliance, according to a survey by Gartner conducted in 2018. As more and more software, services and technology spending moves to cloud computing solutions, the need for data security continues to expand. For example, customers with strict data-privacy controls require that the personally identifiable information (PII) of their users be encrypted before it is stored in the cloud. That is, customers require that data security solutions address privacy concerns of users, including the General Data Protection Regulation (GDPR) on data protection and privacy for individuals within the European Union (EU) and the European Economic Area (EEA), which also addresses the export of personal data outside the EU and EEA areas. GDPR also codifies the right to be forgotten, in addition to the right to erasure, and regulates erasure obligations. The right to be forgotten has been defined as the right to silence on past events in life that are no longer occurring, and leads to allowing individuals to have information, videos or photographs about themselves deleted from certain internet records so that they cannot be found by search engines. Personal data must be erased immediately where the data are no longer needed for their original processing purpose, or the data subject has withdrawn consent and there is no other legal ground for processing, the data subject has objected and there are no overriding legitimate grounds for the processing, or erasure is required to fulfill a statutory obligation under the EU law.

When data is stored in the cloud, traditional firewalls are not able to effectively control the downloading and uploading of data. Data security depends on users' credentials. An attacker can gain access to a host by exploiting an application or operating system vulnerability, manipulating a user, leveraging stolen credentials, or taking advantage of lax security practices. Usage anomalies, such as an employee downloading, sharing, or uploading data from an app excessively or logins from multiple locations can indicate compromised credentials. In one example, compromised credentials are identified by alerting on new or rare authentication activity. These usage anomalies can indicate out-of-compliance behaviors and even the presence of malware.

Introspection is usable to scan the users for a specific action. Because introspection is very expensive, historical approaches have typically limited scans to the 'sent items' folder for an app such as Office 365 due to the concern that sensitive data is leaving the organization. Security administrators at organizations need to have the option of targeting scanning to cloud-based services that particular users have access to and a more complete list of document locations to determine what sensitive data, associated with a particular user, may have been compromised. This approach is useful for software as a service (SaaS) applications, such as Office 365, Box™ storage application and Dropbox™ file hosting application, to look for data that could have been breached due to a particular user's compromised credentials.

The disclosed technology for incident-driven and user-targeted data loss prevention solves the problem of determining data exposure for an organization due to the compromised credential of a particular user at the organization. Trigger events that indicate that credentials of a particular user have been compromised can be a new email coming into a compromised database. In one use case, an administrator identifies a list of users who are under investigation and on a request basis, a disclosed enhanced N-CASB identifies one or more of the cloud-based services that the users have access to and at least one document location on the cloud-based service to inspect for sensitive documents, and performs deep inspection of documents stored at the identified document locations, such as folders in Office 365, Box, Dropbox or Google Docs, for each of the identified users. Users who utilize email addresses that appear in compromised credentials are identified for investigation in one example. The compromised credential is the user's email address in many cases. Based on detected sensitive documents, the N-CASB determines data exposure for the organization due to the compromised credentials of the identified user.

In another use case, after a user has exited an organization, the disclosed N-CASB identifies one or more document locations on at least one of the cloud-based services to which the user continued to have access post-exit, performs deep inspection of documents stored at the identified document locations and detects sensitive documents. Based on the sensitive documents, the N-CASB determines data exposure for the organization due to the continued access of the particular user to the sensitive documents post-exit.

In a third use case, the disclosed N-CASB controls infiltration of contaminating content on cloud-based services in use by users of an organization by monitoring content deposit to the cloud-based services. Contaminating content can include information from a former employer or other competitor organization. The N-CASB identifies the cloud-based services that the particular user has access to and at least one document location on the cloud-based services that the new user gained access to post-joining, to inspect for sensitive documents, and performs deep inspection of content stored at document locations that the new user gained access to post-joining. If contaminating content is detected, the N-CASB determines a litigation exposure for the organization due to the access of the new user. An example system for incident-driven and user-targeted data loss prevention is described next.

FIG. 1A shows an architectural level schematic of a system 100 for incident-driven and user-targeted data loss prevention. Because FIG. 1A is an architectural diagram, certain details are intentionally omitted to improve clarity of the description. The discussion of FIG. 1A will be organized as follows. First, the elements of the figure will be described, followed by their interconnections. Then, the use of the elements in the system will be described in greater detail.

System 100 includes organization network 102, Netskope cloud access security broker (N-CASB) 155, cloud services 108 and public network 145. Organization network 102 includes computers 112a-n, tablets 122a-n and cell phones 132a-n. In another organization network, additional mobile devices may be utilized by organization users. Netskope cloud access security broker (N-CASB) 155 governs access and activities in sanctioned and unsanctioned cloud apps, secures sensitive data and prevents its loss, and protects against internal and external threats. Cloud services 108 includes cloud-based hosting service 118, cloud hosted email services 128 and cloud-based storage service 138.

Continuing with the description of FIG. 1A, Netskope cloud access security broker (N-CASB) 155 includes active analyzer 165 and introspective analyzer 175 that identify the users of the system and sets policies for apps. Introspective analyzer 175 interacts directly with cloud-based services 108 for inspecting data at rest. In a polling mode, introspective analyzer 175 calls the cloud-based services using API connectors to crawl data resident in the cloud-based services and check for changes. As an example, Box™ storage application provides an admin API called the Box Content API™ that provides visibility into an organization's accounts for identified users, including audit logs of Box folders, that can be inspected to determine whether any sensitive files were downloaded after a particular date, at which the credentials were compromised. Introspective analyzer 175 polls this API to discover any changes made to any of the accounts. If changes are discovered, the Box Events API™ is polled to discover the detailed data changes. In a callback model, introspective analyzer 175 registers with the cloud-based services via API connectors to be informed of any significant events. For example, introspective analyzer 175 can use Microsoft Office365 Webhooks API™ to learn when a file has been shared externally. Introspective analyzer 175 also has deep API inspection (DAPII), deep packet inspection (DPI), and log inspection capabilities and includes a DLP engine that applies the different content inspection techniques on files at rest in the cloud-based services, to determine which documents and files are sensitive, based on policies and rules stored in storage 186. The result of the inspection by introspective analyzer 175 is generation of user-by-user data and file-by-file data. After being generated, the user-by-user data and the file-by-file data is stored in metadata store 148. In one implementation, the user-by-user data and the file-by-file data is stored in a semi-structured data format like JSON, BSON (Binary JSON), XML, Protobuf, Avro, or Thrift object, which comprises fields (or columns) and corresponding values of potentially different types like numbers, strings, arrays, and objects.

Continuing further with the description of FIG. 1A, N-CASB 155 further includes monitor 184 that includes extraction engine 171, classification engine 172, security engine 173, management plane 174 and data plane 180. Also included in N-CASB 155, storage 186 includes content policies 187, content profiles 188, content inspection rules 189, enterprise data 197, information for clients 198 and user identities 199. Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any other text-based document. User identity refers to an indicator that is provided by the network security system to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or userid corporate identity directory, but is distinct from it. In one implementation, a cryptographic certificate signed by the network security is used as the user identity. In other implementations, the user identity can be solely unique to the user and be identical across devices.

Embodiments can also interoperate with single sign-on (SSO) solutions and/or corporate identity directories, e.g. Microsoft's Active Directory. Such embodiments may allow policies to be defined in the directory, e.g. either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor—e.g. a dedicated account held by the system that holds the only credentials to sign in to the service. In other embodiments, the client may encrypt the sign on credentials before passing the login to the hosted service, meaning that the networking security system "owns" the password.

Storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud services 108. Non-structured data, such as free text, can also be provided by, and targeted back to cloud services 108. Both structured and non-structured data are capable of being aggregated by introspective analyzer 175. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 148 like Apache Cassandra™ 158, Google's BigTable™, HBase™ Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In one implementation, introspective analyzer 175 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parsing or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by introspective analyzer 175 are not homogenous (e.g., there are many different sources in many different formats), certain implementations employ at least one metadata parser per cloud service, and in some cases more than one. In other implementations, introspective analyzer 175 uses monitor 184 to inspect the cloud services and assemble content metadata. In one use case, the identification of sensitive documents is based on prior inspection of the document. Users can manually tag documents as sensitive, and this manual tagging updates the document metadata in the cloud services. It is then possible to retrieve the document metadata from the cloud service using exposed APIs and use them as an indicator of sensitivity.

In the interconnection of the elements of system 100, network 145 couples computers 112a-n, tablets 122a-n, cell phones 132a-n, cloud-based hosting service 118, web service 128, cloud-based storage service 138 and N-CASB 155 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1A, N-CASB 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing N-CASB 155 on direct physical computers or traditional virtual machines. Additionally, one or more engines can be used and one or more points of presence (POPs) can be established to implement the security functions. The engines or system components of FIG. 1A are implemented by software running on varying types of computing devices. Example devices are a workstation, a server, a computing cluster, a blade server, and a server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs is hosted on the client's premises or located in a virtual private network controlled by the client.

N-CASB 155 provides a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 108 and organization network 102. Although we use the term "network security system" to describe N-CASB 155, more generally the system provides application visibility and control functions as well as security. In one example, thirty-five thousand cloud applications are resident in libraries that intersect with servers in use by computers 112a-n, tablets 122a-n and cell phones 132a-n in organization network 102.

Computers 112a-n, tablets 122a-n and cell phones 132a-n in organization network 102 include management clients with a web browser with a secure web-delivered interface provided by N-CASB 155 to define and administer content policies 187, according to one implementation. N-CASB 155 is a multi-tenant system, so a user of a management client can only change content policies 187 associated with their organization, according to some implementations. In some implementations, APIs can be provided for programmatically defining and or updating policies. In such implementations, management clients can include one or more servers, e.g. a corporate identities directory such as a Microsoft Active Directory, pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the N-CASB 155 data is controlled based on roles, e.g. read-only vs. read-write.

In addition to periodically generating the user-by-user data and the file-by-file data and persisting it in metadata store 148, active analyzer 165 and introspective analyzer 175 also enforce security policies on the cloud traffic. For further information regarding the functionality of active analyzer 165 and introspective analyzer 175, reference can be made to, for example, commonly owned U.S. Pat. No. 9,398,102 (NSKO 1000-2); U.S. Pat. No. 9,270,765 (NSKO 1000-3); U.S. Pat. No. 9,928,377 (NSKO 1001-2); U.S. Pat. No. 10,114,966 (NSKO 1002-1) and U.S. patent application Ser. No. 15/368,246 (NSKO 1003-3); Cheng, Ithal, Narayanaswamy, and Malmskog Cloud Security For Dummies, Netskope Special Edition, John Wiley & Sons, Inc. 2015; "Netskope Introspection" by Netskope, Inc.; "Data Loss Prevention and Monitoring in the Cloud" by Netskope, Inc.; "Cloud Data Loss Prevention Reference Architecture" by Netskope, Inc.; "The 5 Steps to Cloud Confidence" by Netskope, Inc.; "The Netskope Active Platform" by Netskope, Inc.; "The Netskope Advantage: Three "Must-Have" Requirements for Cloud Access Security Brokers" by Netskope, Inc.; "The 15 Critical CASB Use Cases" by Netskope, Inc.; "Netskope Active Cloud DLP" by Netskope, Inc.; "Repave the Cloud-Data Breach Collision Course" by Netskope, Inc.; and "Netskope Cloud Confidence Index™" by Netskope, Inc., which are incorporated by reference for all purposes as if fully set forth herein.

For system 100, a control plane may be used along with or instead of management plane 174 and data plane 180. The specific division of functionality between these groups is an implementation choice. Similarly, the functionality can be highly distributed across a number of points of presence (POPs) to improve locality, performance, and/or security. In one implementation, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

N-CASB 155 generates logging information that shows sensitive data, including raw event data, with information gleaned from every cloud application transaction passing through the system. Mining of the event data can thus accomplish several key tasks: identify content-based functions and activities such as creating content, uploading content, posting content, and editing content; identify non-content-based functions and activities such as inviting users to access content, share content, and view content; and establish a baseline usage behavior based on criteria such as: user, user groups, cloud service, cloud service groups, time of day, day of week, geo-location, bandwidth usage, and latency observed. Once the baseline usage behavior is established, anomalous activities are those that do not fit the observed baseline and could be flagged for administrators to review and take action. Example anomalous activities include: user accesses from geo-locations and/or times that do not fit the baseline and bandwidth usage by a user being very high, e.g. over two standard deviations compared to measured baseline. Notably, the rules are sensitive to roles, e.g. a user in a custom-defined sales group may be afforded greater latitude to be in a geo-location identified as non-standard than an employee outside that group. In some implementations, some anomalous activities may also be conditions to policies for which companies define specific actions, such as 'blocking for excessive transfer' until an administrator approves it or 'revoking sharing on a shared folder in cloud storage'. Identified anomalous activities are indicators usable by an administrator who identifies a list of users who are under investigation, in one use case.

Figure 1B:
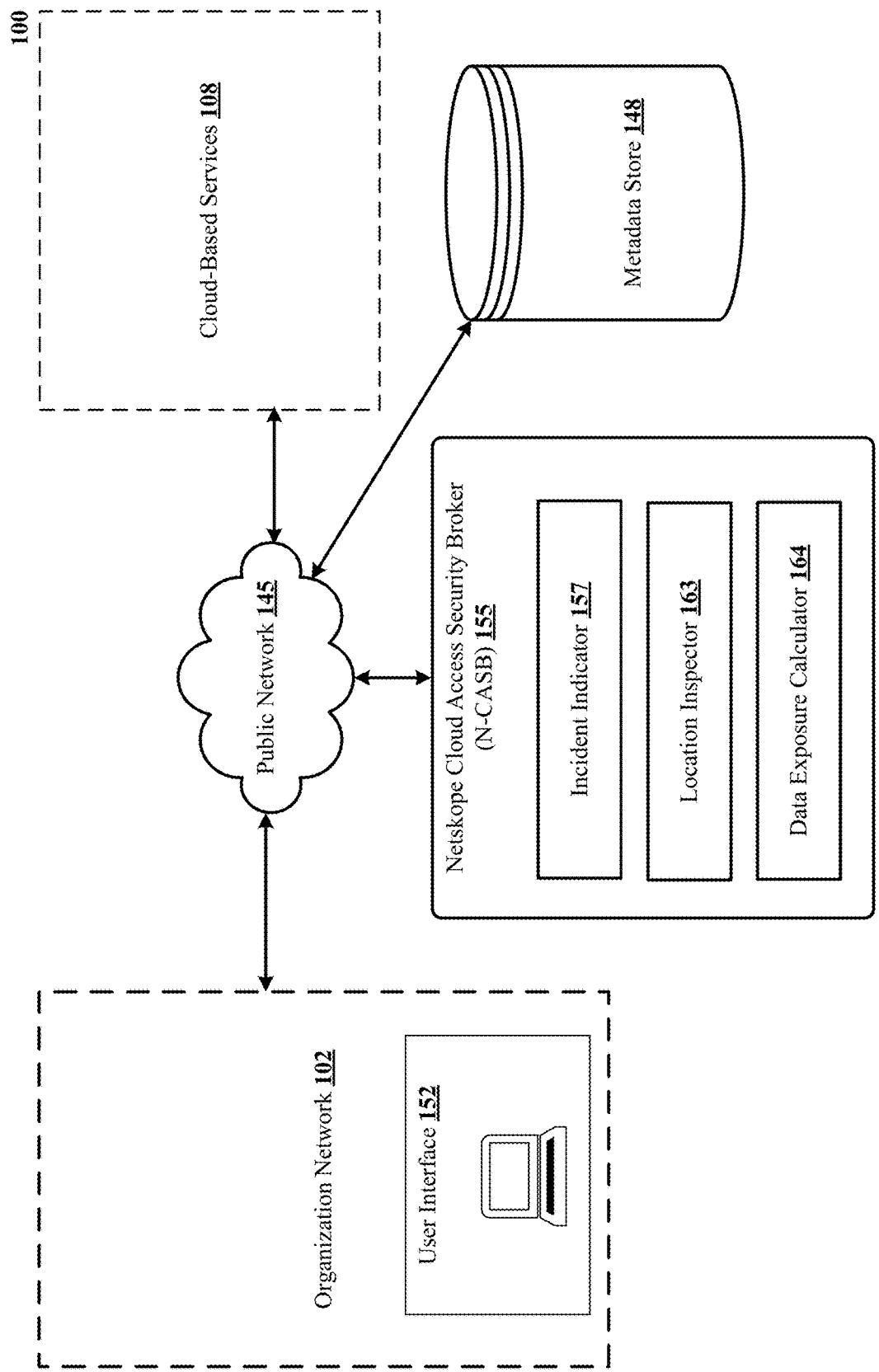
FIG. 1B shows a block diagram for incident-driven and user-targeted data loss prevention.

FIG. 1B shows a block diagram for incident-driven and user-targeted data loss prevention, with N-CASB 155 with incident indicator 157, location inspector 163 and data exposure calculator 164 and a user interface 152 usable by a security admin to interact with the network security system, via user interface screens described later in this application. An incident is an event that may indicate that an organization's systems or data have been compromised, such as an attempt to "edit in Box" from Google Docs, "save to Dropbox" from Slack, or "open in Microsoft Word Online" from Microsoft Office 365 OneDrive. Additional incident examples include attempts to download a confidential document from a corporate-sanctioned Box or AWS instance to a personal Dropbox account, and downloading personally-identifiable information (PII) from any HR app if the user is outside the HR team. Incident indicator 157 identifies the cloud-based services to which a user has access and location inspector 163 identifies the document location on the cloud-based services to inspect for sensitive documents. N-CASB 155 performs deep inspection of the identified documents at the cloud-based services and document location and detects sensitive documents. Deep inspection includes the use of APIs provided by cloud-based apps, such as Box and OneDrive, that enable the discovery of specific resources. One API is for discovering information for all folders and files used by each user in the organization. Another API enables the discovery of file level details, including creation date and time, modified time and shared users. Other cloud-based services apps with structured data, such as for Salesforce expose a schema that N-CASB 155 utilizes to build the metadata store to be used by the deep introspection services.

Continuing with the description of FIG. 1B, in one case N-CASB 155 utilizes user-by-user data and the file-by-file data persisted in metadata store 148 for detecting transmission of sensitive documents, based on examination of activity logs previously generated, without needing to perform the content sensitivity scan. In that case, the sensitivity metadata is generated in advance of receiving the indication, from in-transit inspection of document deposit to, retrieval from, and sharing via the cloud-based services and at-rest introspection of the sensitive documents resident in the cloud-based services.

Data exposure calculator 164 counts the number of detected sensitive documents, and associates counts with the date that the detected documents were transmitted out of the the cloud-based services from the document location. The counts are usable for detecting regulatory violations. Data exposure calculator 164 also determines data compromise for an organization due to the continued access of a user after they have left the organization. Data exposure calculator 164 additionally determines litigation exposure for an organization based on detecting contaminating content, accessible to a new user post-joining, on cloud-based services and at a document location that the user gained access to post-joining.

FIGS. 2 and 3 show various log examples of user-by-user data and file-by-file data regarding interaction of an organization's users with one or more cloud-based services. FIG. 2 is an exemplary event log entry 205 in a JSON-style representation. Event log entry 205 is not exhaustive of the fields that are logged, but rather highlights key fields. Additionally, event logs from external sources can also be provided to N-CASB 155. In the example log listed in FIG. 2 entry 202 identifies a file object using a file object identifier ("id"), entry 212 identifies Dropbox™ as the cloud-based service on which the file object is stored, entry 222 identifies a user identifier ("User Id") of a user who interacted with the file object, entry 252 identifies Rama Rao as the name of the user ("User Name"), entry 262 identifies an IP address associated with a user endpoint used by the user to interact with the file object ("urip"), entry 272 identifies a .txt file type of the file object ("oid"), entry 282 identifies the activity performed by the user as share ("act"), entry 276 identifies an iOS operating system running on the user endpoint ("os"), and entry 286 identifies a source location of the user endpoint ("slc"). As shown in FIG. 2, the user-by-user data and the file-by-file data can include additional entries as well.

In FIG. 3, log 302 contains user-by-user data and file-by-file data that identify user file sharing behavior. For example, the log 302 identifies a file object ("id"), a cloud-based service on which the file object resides as "appname": Box 308, a username of a user who interacted with the file object as "ghostking" 306, whether the user is an admin ("isAdmin"), when the user last logged in ("lastLoginTime"), and a user identifier of the user ("uid"). As shown in log 312, also a Box app entry, the user-by-user data and the file-by-file data can identify additional user file sharing behavior. In this example, logs 302 and 312 identify user file sharing behavior of two users, each identified by their email address. Logs 322, 352, 362 and 372 contain user-by-user data and file-by-file data that identify different key-value pairs representing various user and file characteristics. In some implementations, logs 322, 352, 362 and 372 apply to four distinct file objects. In some implementations of the disclosed technology, data exposure is determined based on whether the detected sensitive documents were transmitted out of at least one of the cloud-based services from the identified document location on or after a date of interest. Date information can provide definitive evidence of a security breach, as opposed to a potential for breach. Section 13402(e)(4) of the HITECH Act states breaches of unsecured protected health information affecting 500 or more individuals must be reported and posted by the department of Health and Human Services (HHS).

Log data is utilized by Netskope cloud access security broker 155 for determining data exposure for the organization due to the compromised credentials of a particular user. Example reasons that credentials are determined to be compromised include the scenario in which documents were uploaded to an unsanctioned cloud service, or downloaded or shared, in conflict with the defined privacy settings for the documents. Compromised credentials are stored independently in metadata store 148. In one example, for a credential that has been compromised in an organization, disclosed N-CASB 155 looks in the email client outlook.com for the compromised credential, which is typically the person's email address, and scans the user's email to determine whether and what kind of sensitive data exists in the user's email folders, including their inbox, outbox drafts and other folders. Sensitive data in the user's folders has been exposed, because the user's credential has been compromised. In another example, N-CASB 155 identifies the users who have permission to connect to Box, and for each user lists the folders accessible to that user, including any folders that are shared with multiple people.

If logs, which include a list of sensitive documents in the folder and details of activities performed relative to those documents, are already available from introspection, N-CASB 155 parses the logs that have been indexed and stored as part of introspection and performs introspection for any data that has not been indexed.

Policy-wise the next step after detecting the presence of sensitive documents for a user with compromised credentials can be to check whether there are any downloads of that sensitive document by the user. In one use case, if an organization identifies a specific sensitive document, the disclosed technology enables the deep inspection of documents stored in all of the folders for the specific user with compromised credentials, to detect the specific sensitive document, if present.

General Data Protection Regulation (GDPR) on data protection and privacy for individuals within the European Union (EU) and the European Economic Area (EEA) defines violations for sharing private information. Health Insurance Portability and Accountability Act (HIPAA) defines data privacy and security provisions for safeguarding medical information, the Social Security Number Confidentiality Act defines social security number protections, and Payment Card Industry Data Security Standard PCI-DSS define requirements for reporting information leaks. For the disclosed method, the data exposure is determined based on a count of the detected sensitive documents in one implementation. For example, healthcare organizations need to determine the count of sensitive documents that contain public health information (PHI) data in the folders of outlook.com for a user. If the count of sensitive documents that contain PHI data exceeds a certain number of records, the organization must report the sensitive document count to the office of Health and Human Services for regulatory reasons. In other examples, sensitive documents include GDPR and PII data. N-CASB 155 measures regulatory compliance based on the count of the detected sensitive documents and detects regulatory violations and flags the regulatory violations for reporting to a regulatory authority.

Figures 4, 5:
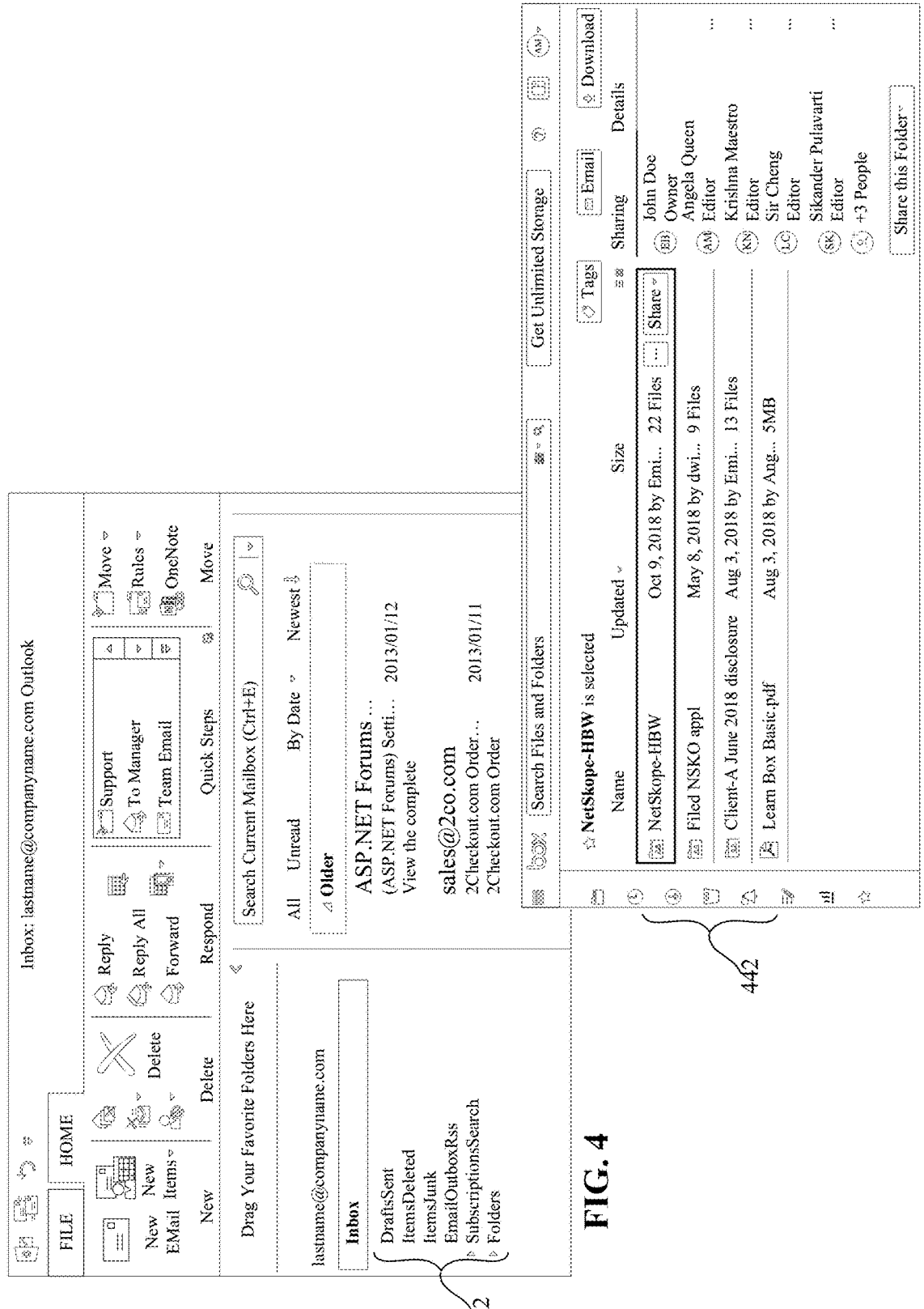
FIG. 4 and FIG. 5 show example folder structures for two cloud-based apps.

FIG. 4 and FIG. 5 show example folder structures for two cloud-based apps. FIG. 4 shows folders 442 for an Outlook online application, for drafts, sent items, deleted items, junk email, outbox, RSS subscriptions and search folders. FIG. 5 shows a set of shared folders in cloud-based app Box.

Figure 6:
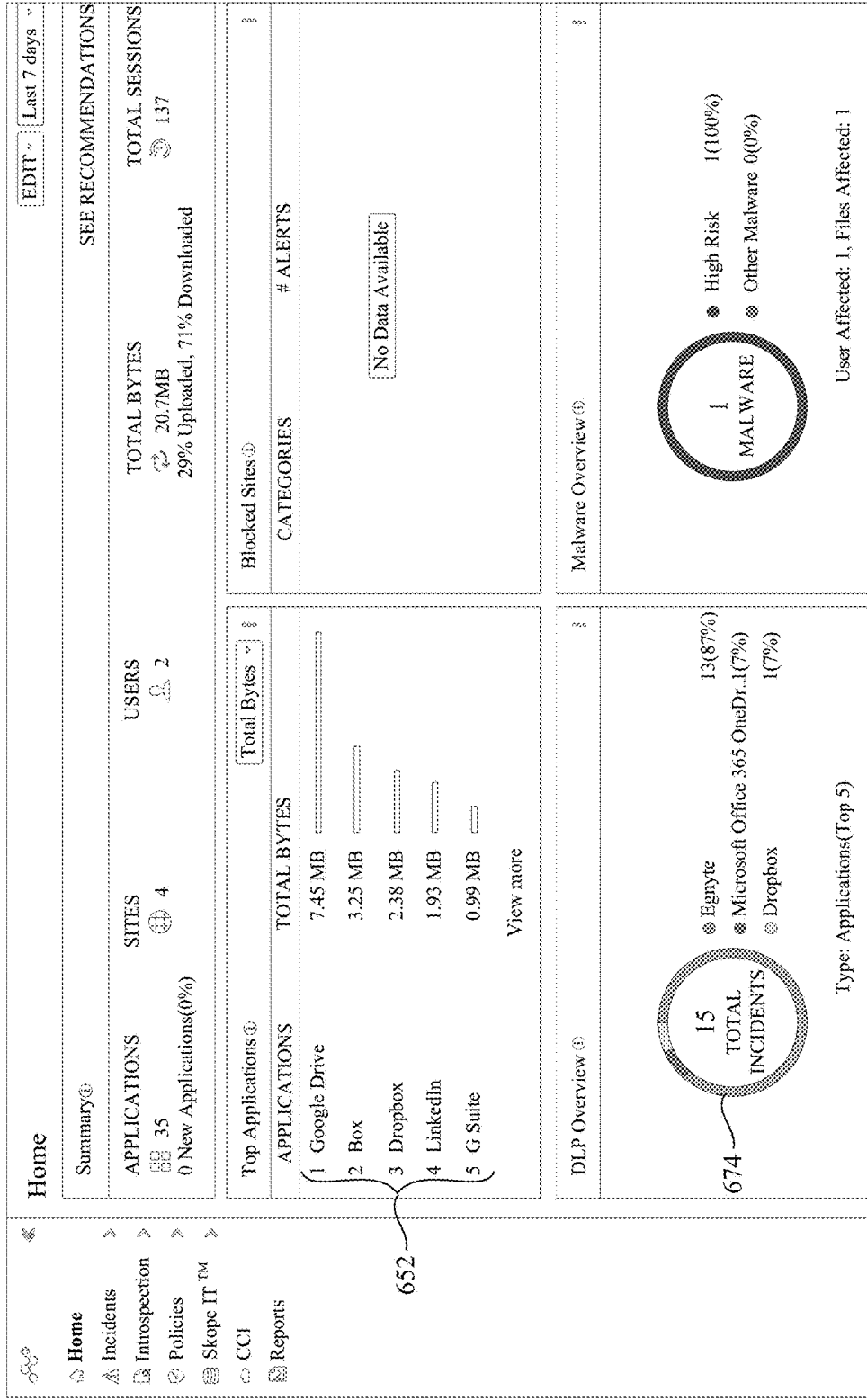
FIG. 6 illustrates a visibility dashboard that provides visibility of enterprise information stored on a cloud computing service.

FIG. 6 illustrates one implementation of a visibility dashboard 600 that provides visibility of enterprise information stored on a cloud computing service (CCS). In one implementation, incident indicator 157 identifies incidents for cloud-based applications 652 and determines a plurality of metadata associated with the objects, as discussed supra.

Further, the assembled metadata is depicted using the visibility dashboard 600 that generates a graphical summary of the number of incidents by application 674 and number of malware incidents in particular.

Figure 7A:
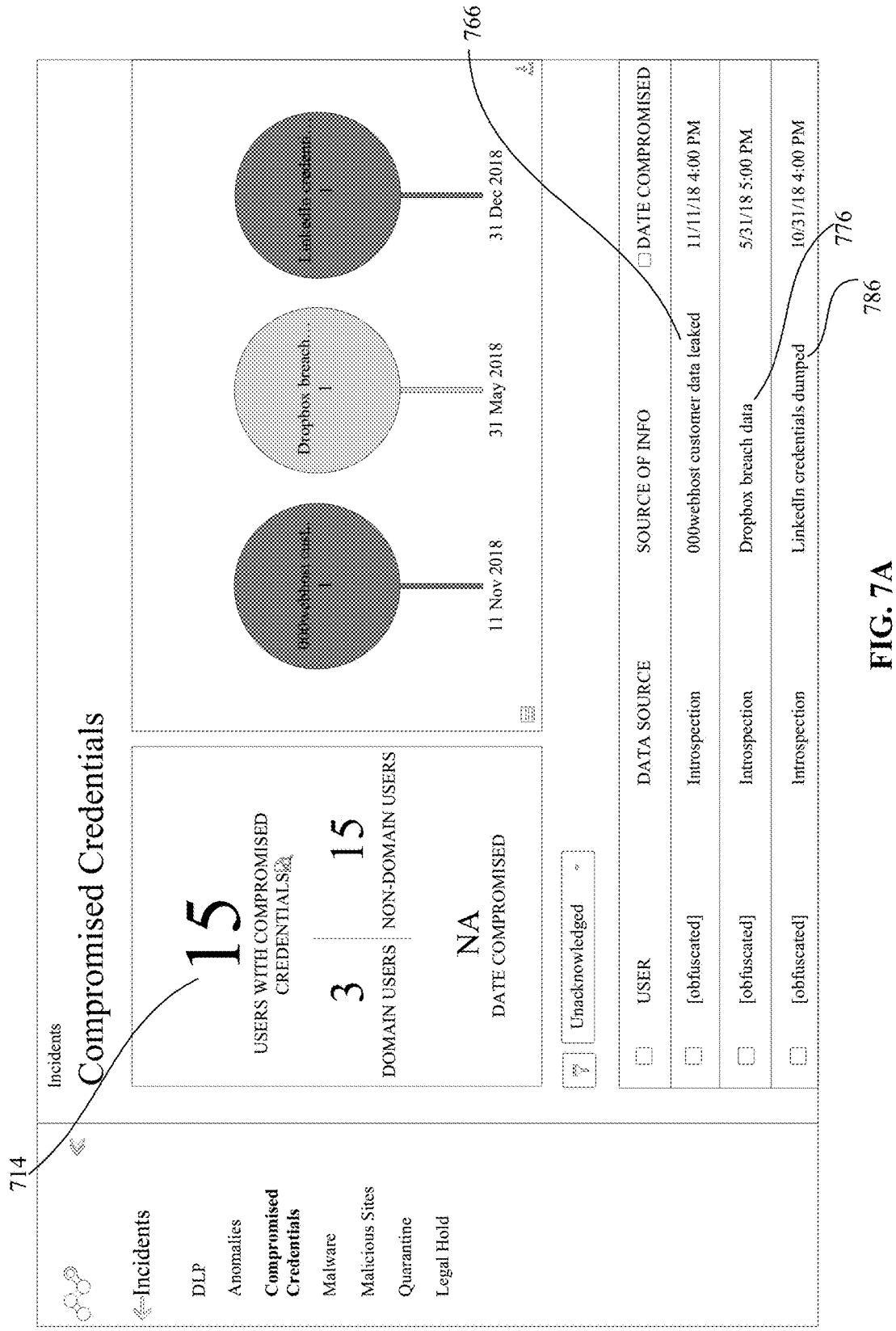
FIG. 7A, FIG. 7B, FIG. 7C, FIG. 7D and FIG. 7E show aspects of a visibility dashboard usable for displaying data exposure details for an organization due to the compromised credentials of a particular user, based on the detected sensitive documents.
Figure 7B:

Netskope cloud access security broker 155 reports detected sensitive documents and data exposure details for users with compromised credentials. FIG. 7A through FIG. 7E show aspects of a visibility dashboard usable for displaying data exposure details due to the compromised credentials of a particular user based on the detected sensitive documents, for an organization. FIG. 7A shows a display 700 of the compromised credentials for incidents for 15 users 714 on a visibility dashboard. In this example, a webhost customer data breach 766, a Dropbox data breach 776 and a linkedIn credential dump 786 are included in the report of compromised credentials for the user, who has be obfuscated for the screenshot. FIG. 7B shows violations 742 and file exposure 746 for a single user 732.

Figure 7C:
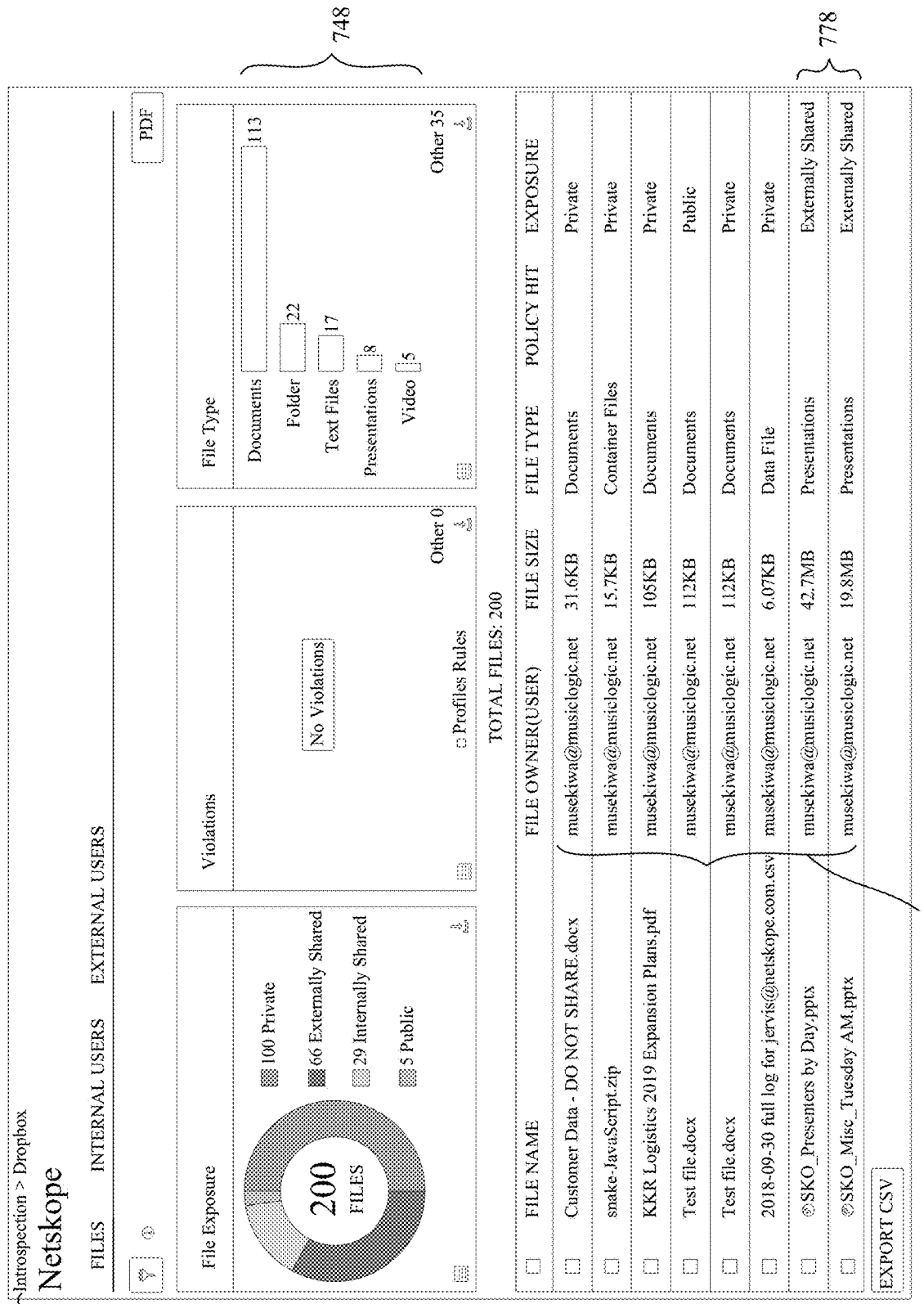
Figure 7D:
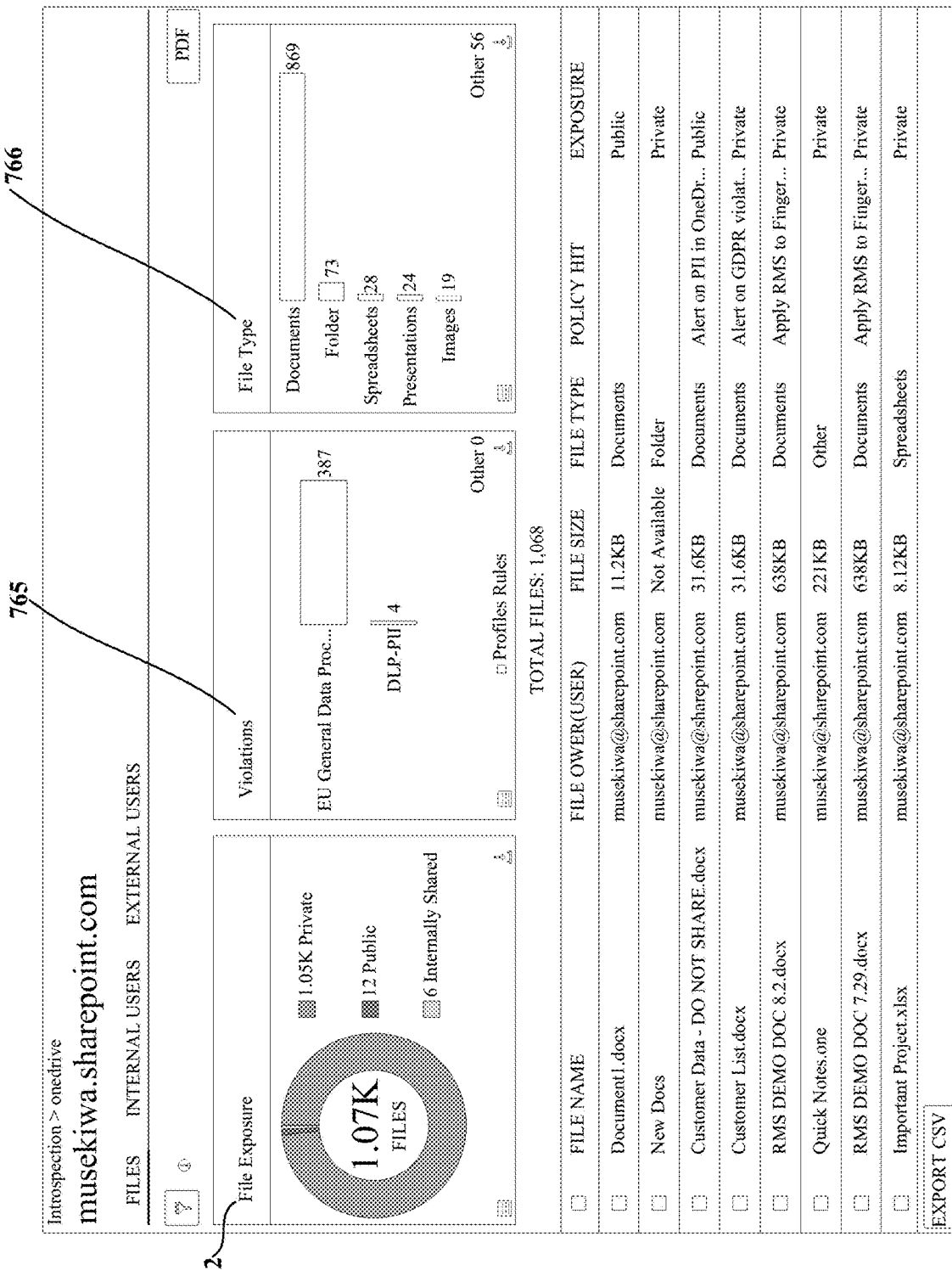
Figure 7E:
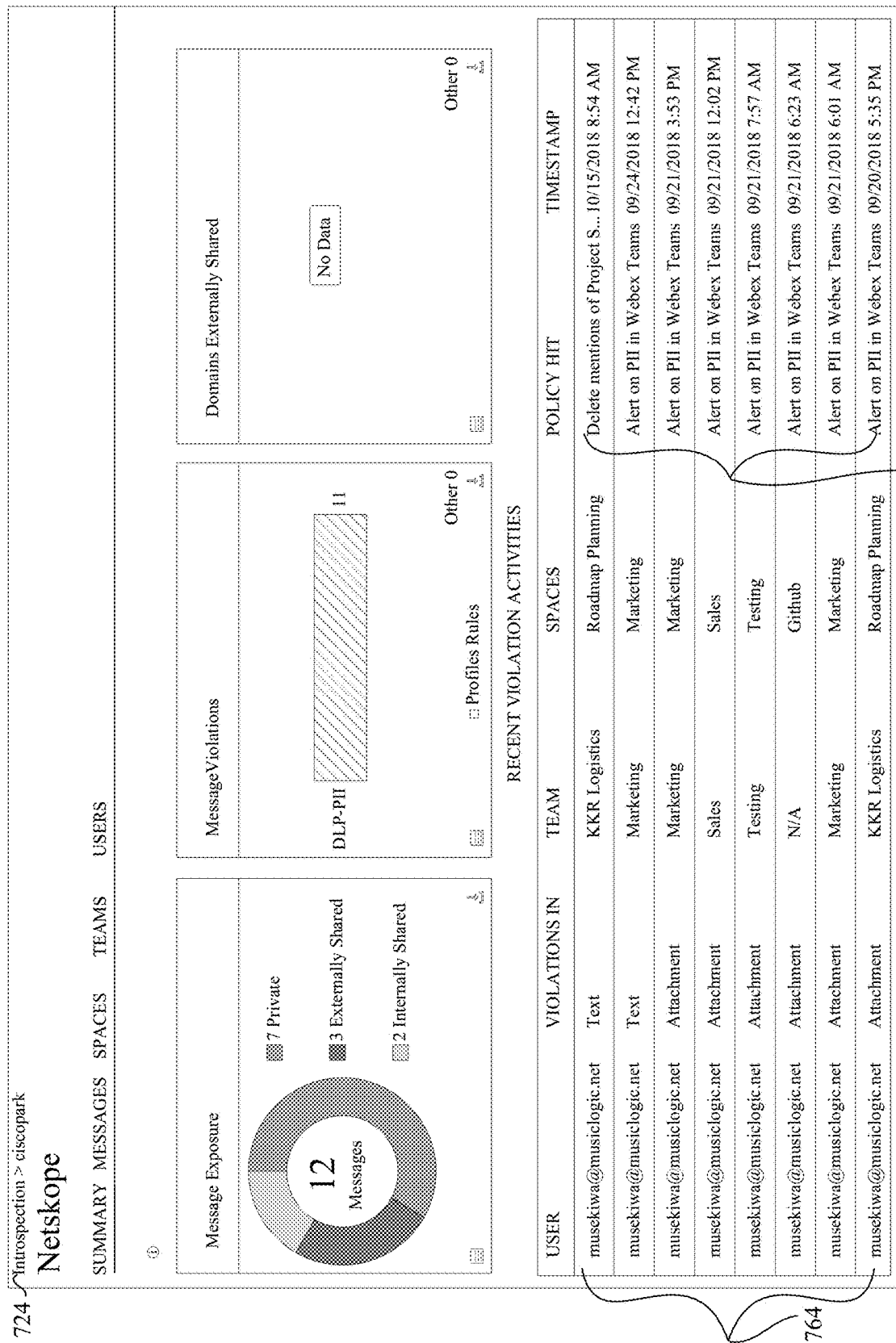

Continuing with examples of data disclosure details, FIG. 7C shows visibility dashboard results for Dropbox 722 for a single user 755 who owns the files. Various file types are included: documents, folders, text files, presentations and video 748. In this example, only the presentations have been externally shared 778. In another use case example, the Dropbox file types can include images, css and confidential folders. FIG. 7D shows, for a single user being investigated for compromised credentials, the relationship between the number of files that are private; public and internally shared, as well as the number and types of violations. FIG. 7D includes graphs of file exposure 762 and violations 765 that include GDPR data and the number of files with DLP-PII data. The file types 766 including documents, folders, spreadsheets presentations and images. FIG. 7E shows an example set of data reported by Netskope cloud access security broker 155 for a Cisco Spark web interface 724 for a single user 764. Policy hits 784 are reported along with the respective timestamps.

The visibility dashboard offers an interface for selecting traffic type and types of activities relative to sensitive files, such as downloads and uploads; and can include additional attributes such as access method, device classification, operating system, browser, file type, user type, source network, source countries, destination countries and file size, in some implementations. In one example, a filter can be set to report incidents for the last 24 hours, last 7 days, last 30 days, last 90 days, last week, or last month. Available actions for detected violations for files, associated with a particular user with compromised credentials, determined to contain sensitive documents include the following configurable options: alert, allow, multi-factor authentication, block, user alert, idle timeout, quarantine, encrypt and bypass actions.

In one use case, a report of sensitive documents can reflect documents from a competitor company accessed by a recently-hired employee using the hiring company's email, Box, Dropbox, web browsers or other access points.

Workflow

Figure 8:
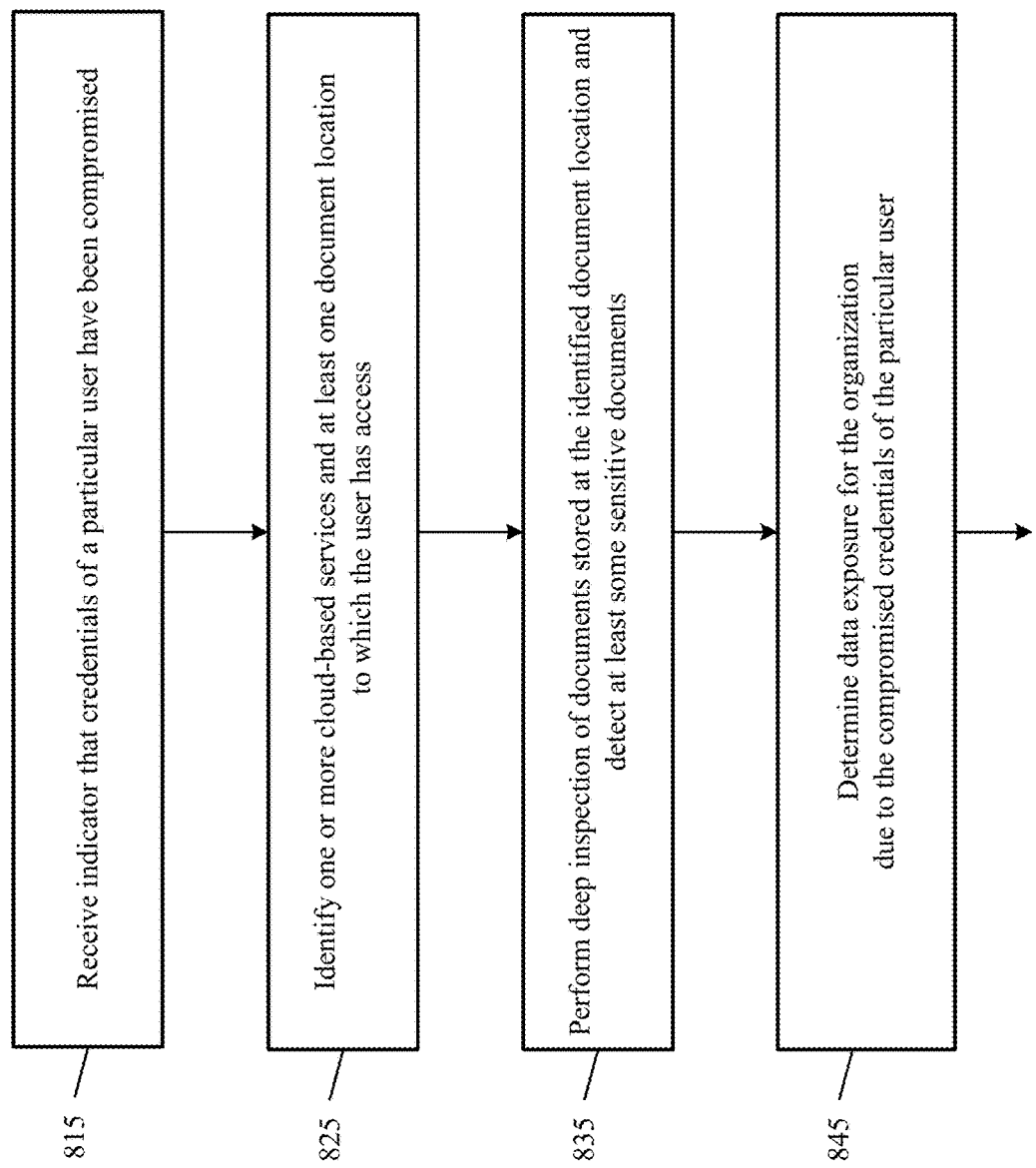
FIG. 8 shows a representative method of incident-driven and user-targeted data loss prevention.

FIG. 8 shows a representative method of incident-driven and user-targeted data loss prevention for detecting data exposure. Flowchart 800 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this flowchart is described with reference to a system which includes a cloud access security broker (CASB) controlling exfiltration of sensitive content in documents stored on cloud-based services in use by users of an organization by monitoring manipulation of the documents.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 8 begins with action 815 in which N-CASB 155 receives an indicator that credentials of a particular user have been compromised.

Process 800 continues at action 825 with N-CASB 155 identifying one or more of the cloud-based services that the particular one of the users has access to and at least one document location on the cloud-based services to inspect for sensitive documents.

Action 835 includes N-CASB 155 performing deep inspection of documents stored at the identified document location and detecting at least some sensitive documents.

At action 845, N-CASB 155 determines a data exposure for the organization due to the compromised credentials of the particular one of the users, based on the detected sensitive documents.

Figure 9:
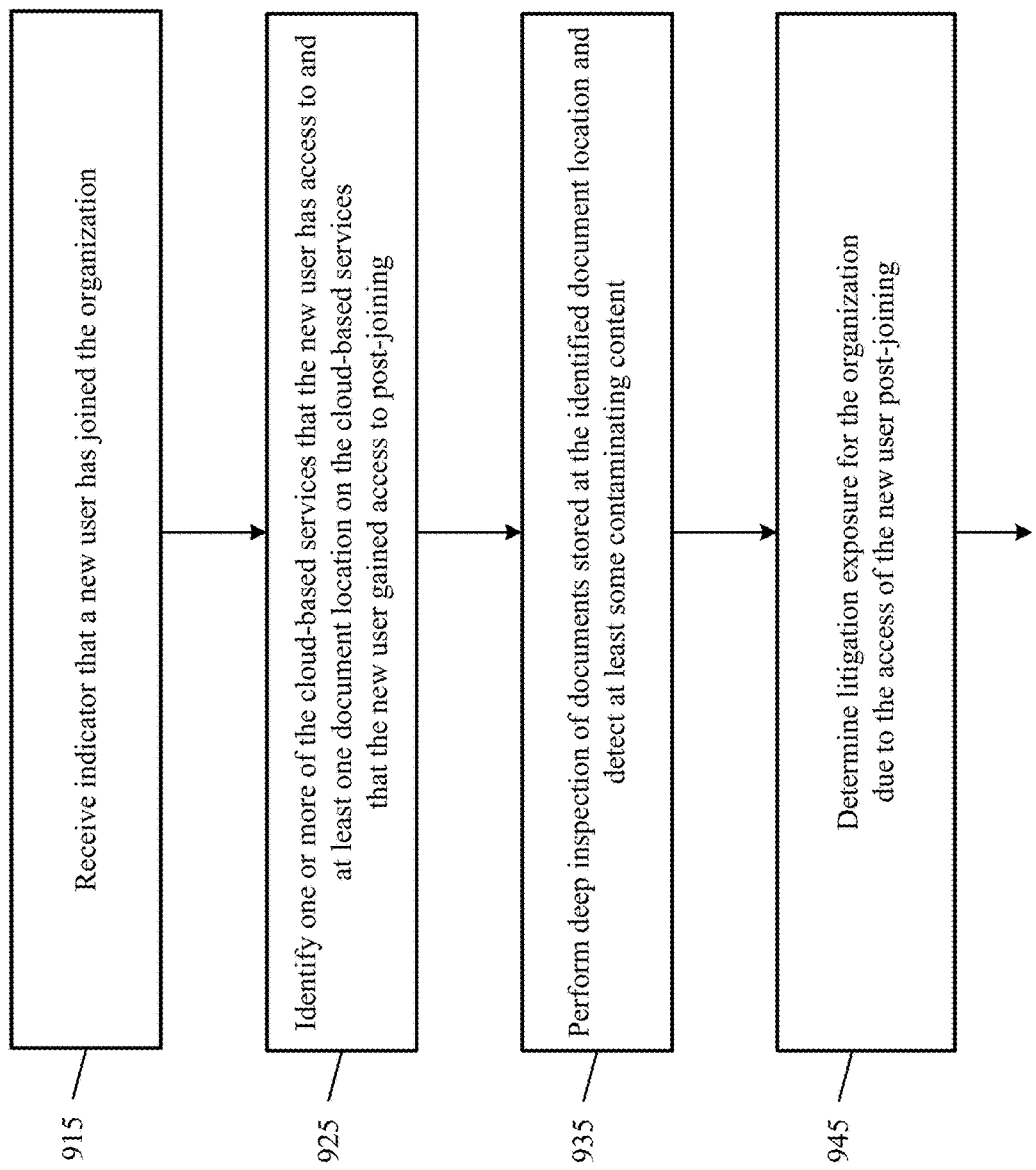
FIG. 9 shows a representative method for controlling infiltration of contaminating content on cloud-based services in use by users of an organization by monitoring content deposit to the cloud-based services.

FIG. 9 shows a representative method for controlling infiltration of contaminating content on cloud-based services in use by users of an organization by monitoring content deposit to the cloud-based services. Flowchart 900 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

FIG. 9 begins with action 915, in which N-CASB 155 receives an indicator that a new user has joined the organization.

Process 900 continues at action 925 with N-CASB 155 identifying one or more of the cloud-based services that the particular one of the users has access to and at least one document location on the cloud-based services to inspect for sensitive documents.

Action 935 includes N-CASB 155 performing deep inspection of documents stored at the identified document location and detecting at least some contaminating content.

At action 945, N-CASB 155 determines a litigation exposure for the organization due to the access of the new user post-joining.

Figure 10:
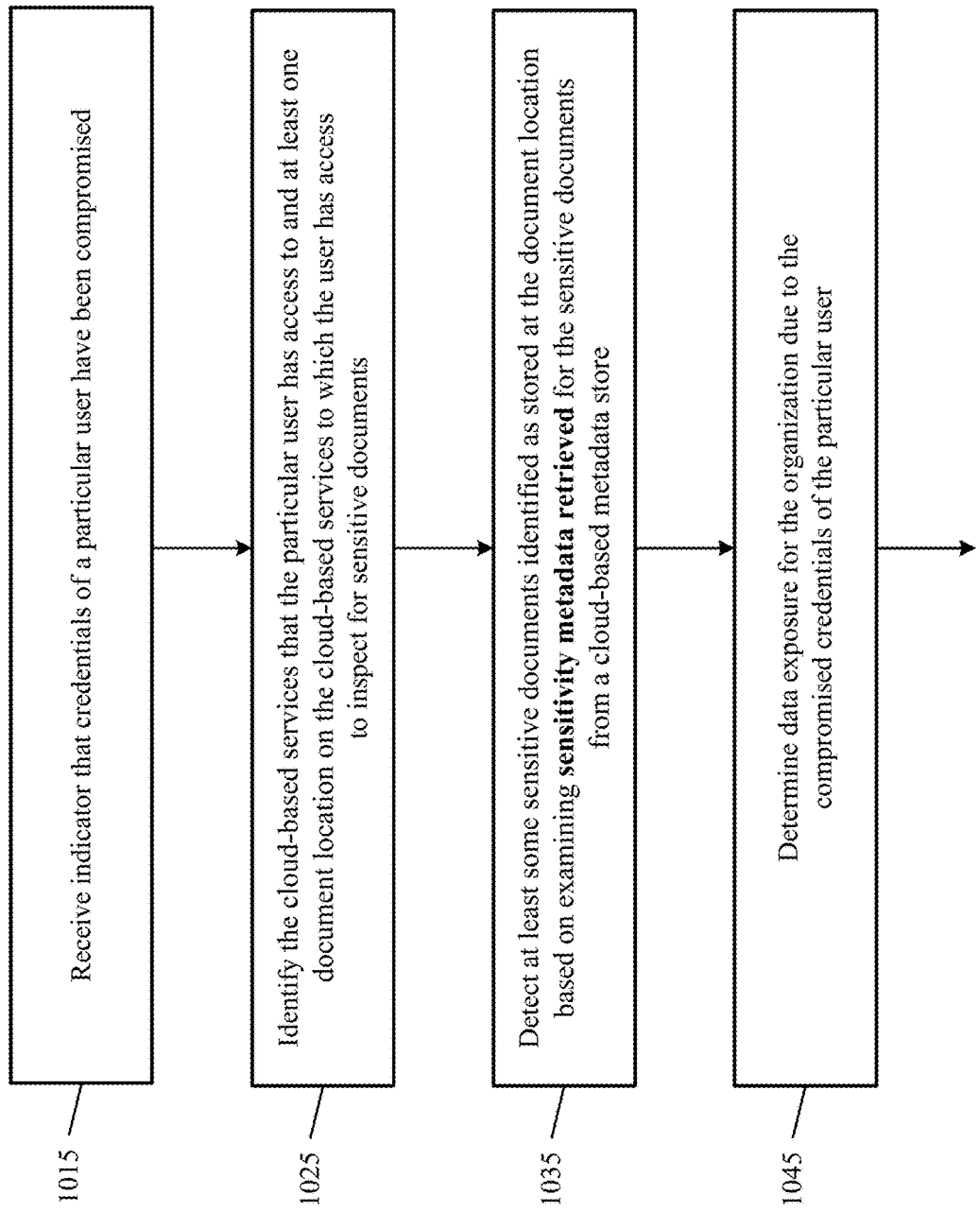
FIG. 10 shows a representative method for incident-driven and user-targeted data loss prevention without needing to perform content sensitivity scan.

FIG. 10 shows a representative method for incident-driven and user-targeted data loss prevention without needing to perform content sensitivity scan. Flowchart 1000 can be implemented at least partially with a computer or other data processing system; that is, by one or more processors configured to receive or retrieve information, process the information, store results, and transmit the results.

FIG. 10 begins with action 1015, in which N-CASB 155 receives an indication that credentials of a particular user have been compromised.

Process 1000 continues at action 1025 with N-CASB 155 identifying one or more of the cloud-based services that the user has access to and at least one document location on the cloud-based services to inspect for sensitive documents.

Action 1035 includes N-CASB 155 detecting at least some sensitive documents identified as stored at the document location based on examining sensitivity metadata retrieved for the sensitive documents from a cloud-based metadata store. The sensitivity metadata is previously generated, in advance of receiving the indication, from in-transit inspection of document deposit to, retrieval from, and sharing via the at least one of the cloud-based services and at-rest introspection of the sensitive documents resident in the at least one of the cloud-based services.

At action 1045, N-CASB 155 determines a data exposure for the organization due to the compromised credentials of the particular user.

Other implementations may perform the actions in different orders and/or with different, fewer or additional actions than those illustrated in FIG. 10. Multiple actions can be combined in some implementations. For convenience, this flowchart is described with reference to a system which includes a CASB controlling exfiltration of sensitive content in documents stored on cloud-based services in use by users of an organization by monitoring manipulation of the documents. For convenience, this flowchart is described with reference to the system that carries out a method. The system is not necessarily part of the method.

Figure 12:
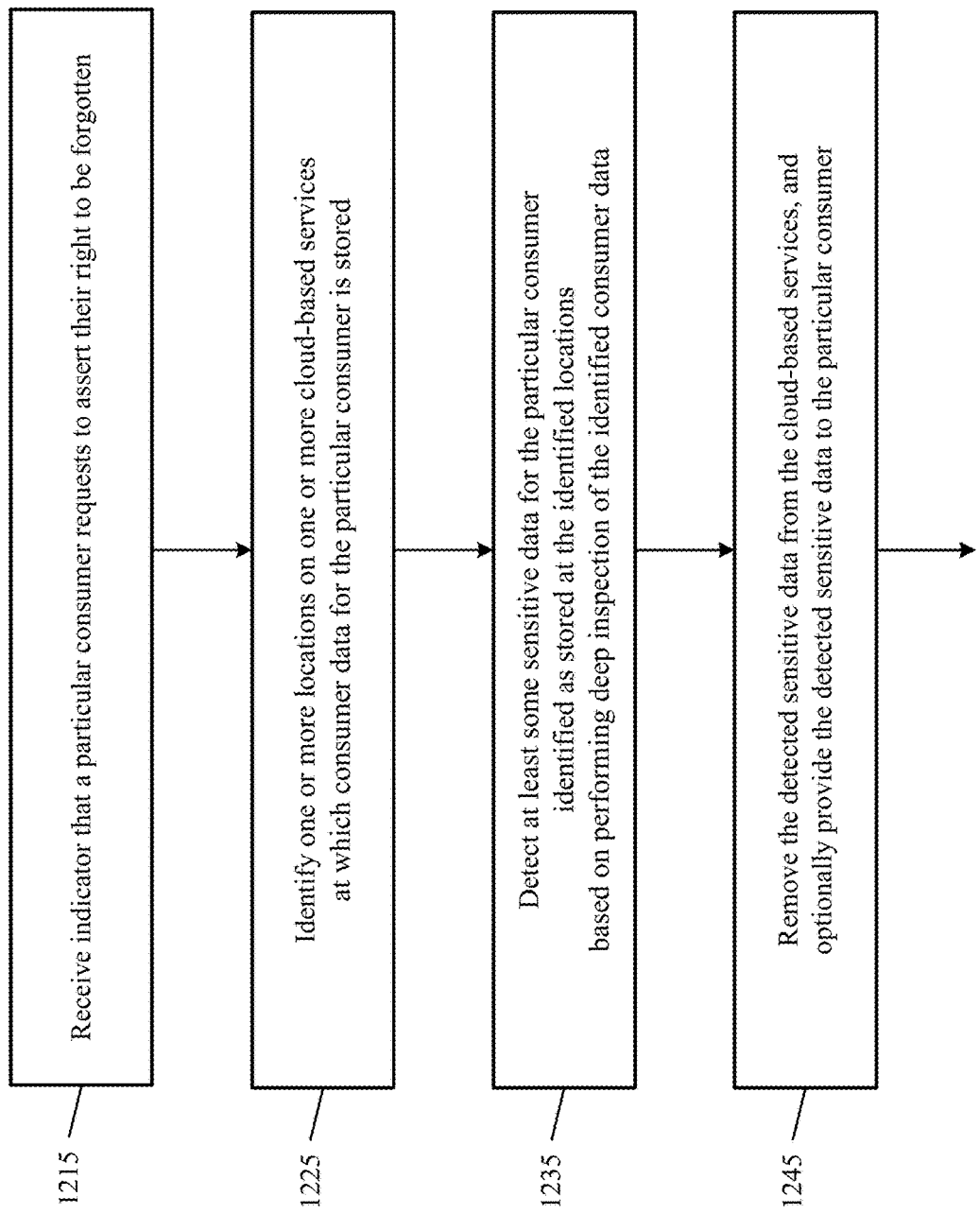
FIG. 12 shows a representative method for request-driven and user-targeted data loss prevention for the right to be forgotten request use case.

FIG. 12 shows a representative method for request-driven and user-targeted data loss prevention. Flowchart 1200 can be implemented at least partially with a computer or other data processing system; that is, by one or more processors configured to receive or retrieve information, process the information, store results, and transmit the results.

FIG. 12 begins with action 1215, in which N-CASB 155 receives a right to be forgotten request from a particular consumer.

Process 1200 continues at action 1225 with N-CASB 155 identifying one or more locations on one or more cloud-based services at which consumer data for the particular consumer is stored.

Action 1235 includes N-CASB 155 performing deep inspection of the consumer data stored at the identified locations and detecting at least some sensitive data in the consumer data.

At action 1245, N-CASB 155 fulfills the right to be forgotten request by removing the detected sensitive data from the cloud-based services determines a data exposure for the organization due to the compromised credentials of the particular user, and optional providing the detected sensitive data to the particular consumer.

Other implementations may perform the actions in different orders and/or with different, fewer or additional actions than those illustrated in FIG. 12. Multiple actions can be combined in some implementations. For convenience, this flowchart is described with reference to a system which includes a CASB controlling exfiltration of sensitive content in documents stored on cloud-based services in use by users of an organization by monitoring manipulation of the documents. For convenience, this flowchart is described with reference to the system that carries out a method. The system is not necessarily part of the method.

Computer System

Figure 11:
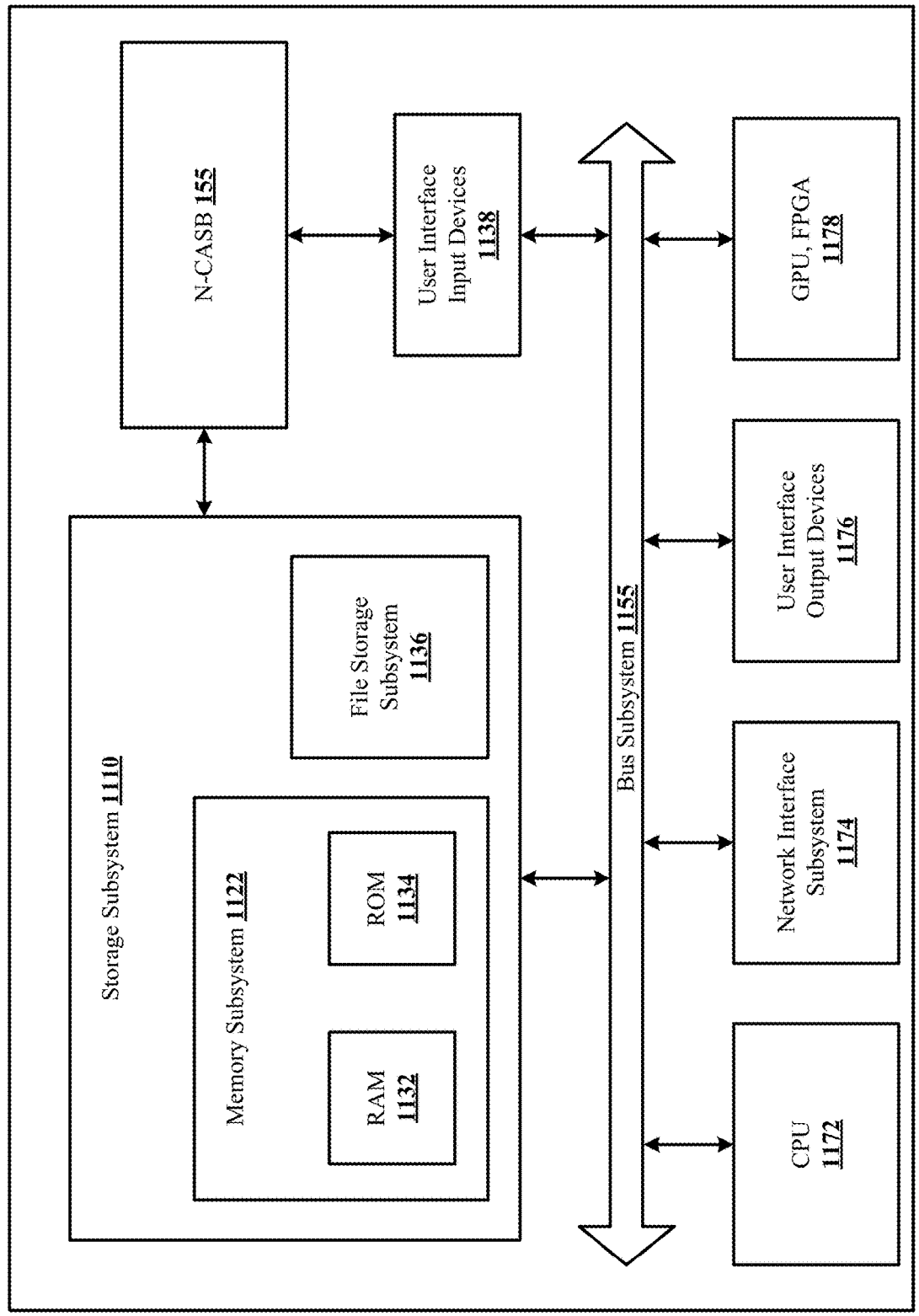
FIG. 11 is a simplified block diagram of a computer system 1100 that can be used to implement incident-driven and user-targeted data loss prevention.

FIG. 11 is a simplified block diagram of a computer system 1100 that can be used to implement incident-driven and user-targeted data loss prevention. Computer system 1100 includes at least one central processing unit (CPU) 1172 that communicates with a number of peripheral devices via bus subsystem 1155. These peripheral devices can include a storage subsystem 1110 including, for example, memory devices and a file storage subsystem 1136, user interface input devices 1138, user interface output devices 1176, and a network interface subsystem 1174. The input and output devices allow user interaction with computer system 1100. Network interface subsystem 1174 provides an interface to outside networks, including an interface to corresponding interface devices in other computer systems.

In one implementation, the cloud-based network security system (NSS) 135 of FIG. 1 is communicably linked to the storage subsystem 1110 and the user interface input devices 1138.

User interface input devices 1138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1110 stores programming and data constructs that provide the functionality of some or all of the modules and methods described herein. Subsystem 1178 can be graphics processing units (GPUs) or field-programmable gate arrays (FPGAs).

Memory subsystem 1122 used in the storage subsystem 1110 can include a number of memories including a main random access memory (RAM) 1132 for storage of instructions and data during program execution and a read only memory (ROM) 1134 in which fixed instructions are stored. A file storage subsystem 1136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1136 in the storage subsystem 1110, or in other machines accessible by the processor.

Bus subsystem 1155 provides a mechanism for letting the various components and subsystems of computer system 1100 communicate with each other as intended. Although bus subsystem 1155 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1100 depicted in FIG. 11 is intended only as a specific example for purposes of illustrating the preferred embodiments of the present disclosed technology. Many other configurations of computer system 1100 are possible having more or less components than the computer system depicted in FIG. 11.

Particular Implementations

Some particular implementations and features for incident-driven and user-targeted data loss prevention are described in the following discussion.

In one disclosed implementation, tangible non-transitory computer readable storage media, including program instructions loaded into memory that, when executed on processors, cause the processors to implement a method of incident-driven and user-targeted data loss prevention includes a cloud access security broker (CASB) controlling exfiltration of sensitive content in documents stored on cloud-based services in use by users of an organization by monitoring manipulation of the documents. The method includes, in response to receiving an indication that credentials of a particular one of the users have been compromised, the CASB identifying one or more of the cloud services that the particular one of the users has access to and at least one document location on the cloud-based services to inspect for sensitive documents. Additionally included in the method is the CASB performing deep inspection of documents stored at the document location and detecting at least some sensitive documents, and based on the detected sensitive documents, the CASB determining a data exposure for the organization due to the compromised credentials of the particular one of the users.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

For some implementations, tangible non-transitory computer readable storage media, including program instructions loaded into memory that, when executed on processors, cause the processors to implement the disclosed method wherein the compromised credentials are single sign-on authentication credentials for accessing the one or more of the cloud-based services. In one implementation of the disclosed technology, the data exposure is determined based on a count of the detected sensitive documents. Some implementations further include the CASB measuring regulatory compliance based on the count of the detected sensitive documents and detecting regulatory violations, and flagging the regulatory violations for reporting to a regulatory authority.

For one implementation, tangible non-transitory computer readable storage media, including program instructions loaded into memory that, when executed on processors, cause the processors to implement the disclosed method wherein compromise of the documents subject to the data exposure is determined based on determination by the CASB that the detected sensitive documents were transmitted out of the at least one of the cloud-based services from the identified document location on or after a date of interest. In some implementations, the date of interest is at least one of when the credentials were compromised and when the exit occurred. In some implementations, the transmission is detected based on examination of activity logs previously generated, in advance of receiving the indication, from document deposit to, retrieval from, and sharing via the at least one of the cloud-based services.

In one implementation of the disclosed technology, at least one of the cloud-based services is a cloud-hosted email service and the identified document location is at least one of inbox folder, sent folder, outbox folder, drafts folder, and deleted folder. Cloud-hosted email service can be accessed via web browser or other apps that may use protocols different from http(s). In another implementation, at least one of the cloud-based services is a cloud storage service and the identified document location is at least one of user folder and group folder.

Some implementations of the disclosed technology further include, in response to receiving an indication that a particular one of the users has exited the organization, the CASB identifying at least one document location on at least one of the cloud-based services that the particular one of the users continued to have access to post-exit. Also further included is the CASB performing deep inspection of documents stored at the identified document location and detecting at least some sensitive documents, and based on the detected sensitive documents, the CASB determining a data compromise for the organization due to the continued access of the particular one of the users post-exit. Some implementations of the disclosed technology further include, in response to detecting the at least some sensitive documents, triggering a security action, wherein the security action is encrypting the sensitive documents with a key not accessible via the compromised credential.

In one implementation of the disclosed technology, tangible non-transitory computer readable storage media, including program instructions loaded into memory that, when executed on processors, cause the processors to implement a method of incident-driven and user-targeted data loss prevention that includes a CAS) controlling infiltration of contaminating content on cloud-based services in use by users of an organization by monitoring content deposit to the cloud-based services. In response to receiving an indication that a new user has joined the organization, the CASB identifies one or more of the cloud-based services that the particular one of the users has access to and at least one document location on the cloud-based services that the new user gained access to post-joining, to inspect for sensitive documents. The CASB performs deep inspection of content stored at the identified document location and detecting at least some contaminating content, and based on the detected contaminating content, the CASB determines a litigation exposure for the organization due to the access of the new user post-joining.

In some disclosed implementations of the disclosed technology, tangible non-transitory computer readable storage media, including program instructions loaded into memory that, when executed on processors, cause the processors to implement a method of incident-driven and user-targeted data loss prevention without needing to perform content sensitivity scan. The method includes a CASB controlling exfiltration of sensitive content in documents stored on cloud-based services in use by users of an organization by monitoring manipulation of the documents. The method also includes, in response to receiving an indication that credentials of a particular one of the users have been compromised, the CASB identifying one or more of the cloud-based services that the particular one of the users has access to and at least one document location on the cloud-based services to inspect for sensitive documents. The disclosed method further includes the CASB detecting at least some sensitive documents stored at the identified document location based on examining sensitivity metadata retrieved for the sensitive documents from a cloud-based metadata store, wherein the sensitivity metadata is previously generated, in advance of receiving the indication, from in-transit inspection of document deposit to, retrieval from, and sharing via the at least one of the cloud-based services and at-rest introspection of the sensitive documents resident in the at least one of the cloud-based services. The method additionally includes, based on the detected sensitive documents, the CASB determining a data exposure for the organization due to the compromised credentials of the particular one of the users.

One disclosed implementation of the disclosed technology includes tangible non-transitory computer readable storage media, including program instructions loaded into memory that, when executed on processors, cause the processors to implement a method of request-driven and user-targeted data loss prevention that includes a cloud access security broker (CASB) controlling exfiltration of consumer data stored on cloud-based services by a service provider. The method includes, in response to receiving a right to be forgotten request from a particular consumer, the CASB identifying one or more locations on one or more of the cloud-based services at which consumer data for the particular consumer is stored, and the CASB performing deep inspection of the consumer data stored at the identified locations and detecting at least some sensitive data in the consumer data. The disclosed method also includes the CASB fulfilling the right to be forgotten request by removing the detected sensitive data from the cloud-based services. For some implementations, the method further includes, in addition to removing the detected sensitive data from the cloud-based services, the CASB providing the detected sensitive data to the particular consumer.

The sensitive data in the consumer data can be personal data, that is, any information relating to an identifiable person who can be directly or indirectly identified in particular by reference to an identifier. This includes personal identifiers such as name, identification number, location data and/or online identifier. The sensitive data in the consumer data can be personally identifiable information (PII) that can potentially identify a specific individual. Removing the detected sensitive data can included erasing any information directly or indirectly identified as related to an identifiable person. Other implementations of the disclosed technology described in this section can include a computer-implemented method that includes executing on a processor the program instructions from the non-transitory computer readable storage media to perform any of the methods described above. Yet another implementation of the disclosed technology described in this section can include a system including memory and one or more processors operable to execute computer instructions, stored in the memory, to perform any of the methods described above. The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

CLAUSES

Clause 1. A tangible non-transitory computer readable storage media, including program instructions loaded into memory that, when executed on processors, cause the processors to implement a method of request-driven and user-targeted data loss prevention, the method including:
  a cloud access security broker (abbreviated CASB) controlling exfiltration of consumer data stored on cloud-based services by a service provider;
  in response to receiving a right to be forgotten request from a particular consumer, the CASB identifying one or more locations on one or more of the cloud-based services at which consumer data for the particular consumer is stored; the CASB performing deep inspection of the consumer data stored at the identified locations and detecting at least some sensitive data in the consumer data; and the CASB fulfilling the right to be forgotten request by removing the detected sensitive data from the cloud-based services.

Clause 2. The tangible non-transitory computer readable storage media of clause 1, further including program instructions that, when executed on processors, cause the processors to implement the method including:
in addition to removing the detected sensitive data from the cloud-based services, the CASB providing the detected sensitive data to the particular consumer.

Clause 3. A computer-implemented method including executing on a processor the program instructions from the non-transitory computer readable storage media of clause 2.

Clause 4. A system for incident-driven and user-targeted data loss prevention, the system including a processor, memory coupled to the processor, and computer instructions from the non-transitory computer readable storage media of clause 2 loaded into the memory.

What is claimed is:

1. A tangible non-transitory computer readable storage media, including program instructions loaded into memory that, when executed on processors, cause the processors to implement a method of incident-driven and user-targeted data loss prevention, the method including:
  a cloud access security broker (abbreviated CASB) controlling infiltration of contaminating content on cloud-based services in use by users of an organization by monitoring content deposited to the cloud-based services, including:
  in response to receiving an indication that a new user has joined the organization, the CASB identifying at least one document location within one of the cloud-based services, to which the new user gained access post-joining, to inspect for sensitive documents;
  the CASB performing deep inspection of content stored at the identified document location and detecting at least some contaminating content that originated with a competitor of the organization or a former employer of the new user; and
  based on the detected contaminating content, the CASB determining an exposure for the organization due to the contaminating content.

2. The non-transitory computer readable storage media of claim 1, wherein the at least one of the cloud-based services is a cloud-hosted email service and the identified document location is at least one of inbox folder, sent folder, outbox folder, drafts folder, and deleted folder.

3. The non-transitory computer readable storage media of claim 1, wherein the at least one of the cloud-based services is a cloud storage service and the identified document location is at least one of user folder and group folder.

4. The non-transitory computer readable storage media of claim 1, wherein the at least one document location is accessible by the particular one of the users within the cloud-based services.

5. The non-transitory computer readable storage media of claim 1, wherein the exposure for the organization is a litigation exposure.

6. A system for incident-driven and user-targeted data loss prevention, the system including a processor, memory coupled to the processor, and computer instructions loaded into the memory that, when executed, cause the processor to implement a cloud access security broker (abbreviated CASB) that is configured to:
  control infiltration of contaminating content on cloud-based services in use by users of an organization by monitoring content deposited to the cloud-based services, including: in response to receiving an indication that a new user has joined the organization, the CASB identifying at least one document location within one of the cloud-based services, to which the new user gained access post-joining, to inspect for sensitive documents;
  the CASB performing deep inspection of content stored at the identified document location and detecting at least some contaminating content that originated with a competitor of the organization or a former employer of the new user; and
  based on the detected contaminating content, the CASB determining an exposure for the organization due to the contaminating content.

7. The system of claim 6, wherein the at least one of the cloud-based services is a cloud-hosted email service and the identified document location is at least one of inbox folder, sent folder, outbox folder, drafts folder, and deleted folder.

8. The system of claim 6, wherein the at least one of the cloud-based services includes a cloud storage service and the identified document location includes at least one of user folder and group folder.

9. The system of claim 6, wherein the at least one document location is accessible by the particular one of the users within the cloud-based services.

10. The system of claim 6, wherein the exposure for the organization is a litigation exposure.

11. A computer-implemented method of executing, on a processor, instructions for a CASB to implement actions, including:
  controlling infiltration of contaminating content on cloud-based services in use by users of an organization by monitoring content deposited to the cloud-based services, including:
  in response to receiving an indication that a new user has joined the organization, identifying at least one document location within one of the cloud-based services, to which the new user gained access post-joining, to inspect for sensitive documents;
  performing deep inspection of content stored at the identified document location and detecting at least some contaminating content that originated with a competitor of the organization or a former employer of the new user; and
  based on the detected contaminating content, determining an exposure for the organization due to the contaminating content.

12. The computer-implemented method of claim 11, wherein the at least one of the cloud-based services is a cloud-hosted email service and the identified document location is at least one of inbox folder, sent folder, outbox folder, drafts folder, and deleted folder.

13. The computer-implemented method of claim 11, wherein the at least one of the cloud-based services is a cloud storage service and the identified document location is at least one of user folder and group folder.

14. The computer-implemented method of claim 11, wherein the at least one document location is accessible by the particular one of the users within the cloud-based services.

15. The computer-implemented method of claim 11, wherein the exposure for the organization is a litigation exposure.

\* \* \* \* \*